(12) United States Patent
Nick et al.

(10) Patent No.: US 9,701,896 B2
(45) Date of Patent: Jul. 11, 2017

(54) QUANTUM DOT-CONTAINING COMPOSITIONS INCLUDING AN EMISSION STABILIZER, PRODUCTS INCLUDING SAME, AND METHOD

(71) Applicant: SAMSUNG ELECTRONICS CO., LTD., Suwon-si (KR)

(72) Inventors: Robert J. Nick, Pepperell, MA (US); Craig Breen, Somerville, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/284,277

(22) Filed: May 21, 2014

(65) Prior Publication Data
US 2015/0021521 A1    Jan. 22, 2015

Related U.S. Application Data

(63) Continuation of application No. PCT/US2012/066151, filed on Nov. 20, 2012.
(Continued)

(51) Int. Cl.
*C09K 11/02* (2006.01)
*C09K 11/88* (2006.01)
(Continued)

(52) U.S. Cl.
CPC ............ *C09K 11/025* (2013.01); *C09K 11/02* (2013.01); *C09K 11/565* (2013.01);
(Continued)

(58) Field of Classification Search
CPC ... C09K 11/025; C09K 11/02; Y10S 977/774; B82Y 20/00
See application file for complete search history.

(56) References Cited

U.S. PATENT DOCUMENTS 5,881,200 A    3/1999 Burt
6,444,143 B2    9/2002 Bawendi et al.
(Continued)

FOREIGN PATENT DOCUMENTS

AU    A-54514/96    12/1996
GB    2342651    * 9/1999
(Continued)

OTHER PUBLICATIONS

Youn et al, "Dihexadecyl Phosphate, Vesicle-Stabilized and In Situ Generated Mixed CdS and ZnS Semicodunctor Particles. Preparation and Utilization for Photosensitized Charge Separation and Hydrogen Generation", J. Phys. Chem., 92, 1988, pp. 6320-6327.*
(Continued)

*Primary Examiner* — Carol M Koslow
(74) *Attorney, Agent, or Firm* — Cantor Colburn, LLP

(57) ABSTRACT

The present invention relates to a composition including quantum dots and an emission stabilizer, products including same, and methods, including methods for improving, or enhancing the emission stability of quantum dots. Inclusion of an emission stabilizer in a composition can improve or enhance the stability of at least one emissive property of the quantum dots in the composition against degradation compared to a composition that is the same in all respects except that it does not include the emission stabilizer. Examples of such emissive properties include, by way of example only, lumen output, lumen stability, color point (e.g., CIE x, CIE y) stability, wavelength stability, FWHM of the major peak emission, absorption, solid state EQE, and quantum dot emission efficiency.

17 Claims, 8 Drawing Sheets

Related U.S. Application Data

(60) Provisional application No. 61/562,469, filed on Nov. 22, 2011.

(51) Int. Cl.
  *C09K 11/56* (2006.01)
  *B82Y 20/00* (2011.01)

(52) U.S. Cl.
  CPC ............ *C09K 11/883* (2013.01); *B82Y 20/00* (2013.01); *Y10S 977/774* (2013.01)

(56) References Cited

U.S. PATENT DOCUMENTS

| | | | |
|---|---|---|---|
| 6,600,175 | B1 | 7/2003 | Baretz et al. |
| 6,608,332 | B2 | 8/2003 | Shimizu et al. |
| 7,190,870 | B2 | 3/2007 | Sundar et al. |
| 7,244,416 | B2 | 7/2007 | Meyer et al. |
| 7,645,397 | B2 | 1/2010 | Parce et al. |
| 7,671,096 | B2 | 3/2010 | Hosaka et al. |
| 7,976,726 | B2 | 7/2011 | Wang et al. |
| 8,414,800 | B2 | 4/2013 | Jang et al. |
| 2002/0001716 | A1 | 1/2002 | Barbera-Guillem |
| 2005/0118631 | A1 | 6/2005 | Bawendi et al. |
| 2005/0261400 | A1 | 11/2005 | Yang et al. |
| 2005/0266246 | A1 | 12/2005 | Reiss et al. |
| 2006/0165621 | A1 | 7/2006 | Dubertret et al. |
| 2008/0149165 | A1 | 6/2008 | Hoeks et al. |
| 2008/0237540 | A1* | 10/2008 | Dubrow .............. C09K 11/025 252/301.6 S |
| 2009/0155194 | A1 | 6/2009 | Meyer et al. |
| 2009/0162011 | A1 | 6/2009 | Coe-Sullivan et al. |
| 2010/0052512 | A1 | 3/2010 | Clough et al. |
| 2010/0166368 | A1 | 7/2010 | Oron et al. |
| 2010/0221429 | A1 | 9/2010 | Ahn |
| 2010/0264371 | A1* | 10/2010 | Nick .................... C09D 7/1225 252/301.36 |
| 2010/0265307 | A1 | 10/2010 | Linton et al. |
| 2010/0275807 | A1* | 11/2010 | Landry .................. F42B 12/40 102/513 |
| 2010/0283014 | A1 | 11/2010 | Breen et al. |
| 2011/0068321 | A1 | 3/2011 | Pickett et al. |
| 2011/0081538 | A1 | 4/2011 | Linton |
| 2011/0084250 | A1* | 4/2011 | Jang ....................... B82Y 10/00 257/14 |
| 2011/0103064 | A1 | 5/2011 | Coe-Sullivan et al. |
| 2011/0135742 | A1 | 6/2011 | Kim et al. |
| 2011/0176328 | A1 | 7/2011 | Anandan et al. |
| 2011/0186811 | A1 | 8/2011 | Coe-Sullivan et al. |
| 2011/0245533 | A1 | 10/2011 | Breen et al. |
| 2011/0309325 | A1 | 12/2011 | Park et al. |
| 2012/0113671 | A1 | 5/2012 | Sadasivan et al. |
| 2012/0187367 | A1 | 7/2012 | Modi et al. |
| 2012/0189791 | A1 | 7/2012 | Modi et al. |
| 2012/0235079 | A1 | 9/2012 | Iftime et al. |
| 2012/0256141 | A1 | 10/2012 | Nick et al. |
| 2012/0286238 | A1 | 11/2012 | Linton et al. |
| 2012/0313075 | A1 | 12/2012 | Linton et al. |
| 2013/0075692 | A1 | 3/2013 | Naasani et al. |
| 2013/0193407 | A1 | 8/2013 | Clough et al. |
| 2013/0195755 | A1 | 8/2013 | Poselt et al. |
| 2015/0098212 | A1 | 4/2015 | Won et al. |
| 2015/0140678 | A1 | 5/2015 | Qi |

FOREIGN PATENT DOCUMENTS

| | | |
|---|---|---|
| GB | 2342651 A | 4/2000 |
| JP | 59105043 | 6/1984 |
| JP | H0950057 A | 2/1997 |
| WO | WO2008133660 A2 | 11/2008 |
| WO | WO2009002512 A1 | 12/2008 |
| WO | WO2009014590 A2 | 1/2009 |
| WO | WO2009035657 A1 | 3/2009 |
| WO | WO2009137053 A1 | 11/2009 |
| WO | WO2009145813 A1 | 12/2009 |
| WO | WO2009151515 A1 | 12/2009 |
| WO | WO2010014198 A1 | 2/2010 |
| WO | WO2010129350 A2 | 11/2010 |
| WO | WO2010129374 A2 | 11/2010 |
| WO | WO2012021643 A2 | 2/2012 |
| WO | WO2013078252 A1 | 5/2013 |

OTHER PUBLICATIONS

Bang, et al., "Quantum Dot Sensitized Solar Cells. A Tale of Two Semiconductor Nanocrystals: CdSe and CdTe", *ACS Nano* (2009) vol. 3, No. 6, pp. 1467-1476.

Chen, et al., "Luminescent CdSe Quantum Dot Doped Stabilized Micelles", *Nano Letters* (2002), vol. 2, No. 11, pp. 1299-1302.

Cytec Industries, Inc., "CYANEX® 921 Extractant" company brochure (2008), pp. 1-16.

Dabbousi et al, "(CdSe) ZnS Core-Shell Quantum Dots: Synthesis and Characterization of a Size Series of Highly Luminescent Nanocrystallites ", *J. Phys. Chem.* (1997), vol. 101, pp. 9463-9475.

Dickson, et al., "Steric Stabilization of Core-Shell Nanoparticles in Liquid Carbon Dioxide at the Vapor Pressure", *Langmuir* (2004), vol. 20, pp. 9380-9387.

Dubertret, et al., "In Vivo Imaging of Quantum Dots Encapsulated in Phospholipid Micelles", www.sciencemag.org, Nov. 29, 2002, vol. 298.

Gao, et al., "In vivo cancer targeting and imaging with semiconductor quantum dots", *Nature Biotechnology* (2004), vol. 22, No. 8, pp. 969-976.

Gaunt, et al., "Stability and quantum yield effects of small molecule additives on solutions of semiconductor nanoparticles", *Journal of Colloid and Interface Science* (2005), vol. 290, No. 2, pp. 437-443.

Haase, et al., "Photochemistry and Radiation Chemistry of Colloidal Semiconductors. 23. Electron Storage on ZnO Particles and Size Quantization", *J. Phys. Chem.*, (1988) vol. 92, pp. 482-487.

Henglein, et al., "Photochemistry and Radiation Chemistry of Semiconductor Colloids: Reaction of the Hydrated Electron with CdS and Non-Linear Optical Effects", *Chem. Phys. Lett.*, (1986) vol. 132, No. 2, pp. 133-136.

Lei, et al., "Applications of Mesenchymal Stem Cells Labeled with Tat Peptide Conjugated Quantum Dots to Cell Tracking in Mouse Body", *Bioconjugate Chem.* (2008), vol. 19, pp. 421-427.

Lorenz, et al., "Surfactant—Semiconductor Interfaces: Perturbation of the Photoluminescence of Bulk Cadmium Selenide by Adsorption of Tri-n-octylphosphine Oxide as a Probe of Solution Aggregation v Relevance to Nanocrystal Stabilization", *J. Am Chem. Soc.* 1998, 120, 10970-10975.

Mićić, et al., "Size-Dependent Spectroscopy of InP Quantum Dots", *J. Phys. Chem.* (1997) vol. 101, pp. 4904-4912.

Murase, et al., "Fabrication of Photoluminescent Small Glass Capsules Containing Quantum Dots at High Concentration", translation of *AIST press release* dated Jun. 22, 2010 and printed from web site: http://www.aist.go.jp/aist_e/latest_research/2010/20100723/20100723.html on Sep. 6, 2013.

Murray, C.B., et al., "Synthesis and Characterization of Monodisperse Nanocrystals and Close-Packed Nanocrystal Assemblies", *Annu. Rev. Mater. Sci.*, (2000), vol. 30, pp. 545-610.

Murray, C., et al., "Synthesis and Characterization of Nearly Monodisperse CdE (E = S, Se, Te) Semiconductor Nanocrystallites" (Nov. 1993), *J. Am. Chem. Soc.*, 115, pp. 8706-8715.

Murray, C., "Synthesis and Characterization of II-VI Quantum Dots and Their Assembly into 3-D Quantum Dot Superlattices", Thesis, Massachusetts Institute of Technology, Sep. 1995.

Nida, et al., "Photostability of quantum dots with amphiphilic polymer-based passivation strategies", *Nanotechnology* (2008), vol. 19, 035701 (6pp).

Niebling, et al., "Excitation dynamics in polymer-coated semiconductor quantum dots with integrated dye molecules: The role of reabsorption", *J. Appl. Phys.* (2009), vol. 106, 104701 (6pp).

Oda, M., et al., "Reversible photobluing of CdSe/ZnS/TOPO nanocrystals", *Colloids and Surfaces B: Biointerfaces* (2007), vol. 56, pp. 241-245.

(56) References Cited

OTHER PUBLICATIONS

Oda, M., et al., "Photobrightening of CdSe/ZnS/TOPO Nanocrystals", *J. of Luminescence* (2007), vol. 122-123, pp. 762-765.

Oszwatdowski, et al., "Capillary electrophoretic separation and characterizations of CdSe quantum dots", *Cent Eur. J. Chem.* (2010), vol. 8, No. 4, pp. 806-819.

PCT Search Report and Written Opinion mailed Feb. 4, 2013 for PCT/US2012/066151 which is the parent of this case.

Peng, et al., "Kinetics of II-VI and III-V Colloidal Semiconductor Nanocrystal Growth: "Focusing" of Size Distributions", *J. Am. Chem. Soc.* (1998), vol. 120, pp. 5343-5344.

Reiss, "The Growth of Uniform Colloidal Dispersions", *J. Chem. Phys.* (1951), vol. 19, No. 4, pp. 482-487.

Spanhel, et al., "Photochemistry of Colloidal Semiconductors. 20. Surface Modification and Stability of Strong Luminescing CdS Particles", *J. Am. Chem. Soc.* (1987) vol. 109, pp. 5649-5655.

Travert-Branger, et al., "In Situ Electron-Beam Polymerization Stabilized Quantum Dot Micelles", *Langmuir* (2011), vol. 27, pp. 4258-4361.

Vrandecic, et al., "The effect of Ca/Zn stabilizers on the thermooxidative degradation of poly(vinyl chloride)/chlorinated polyethylene blends", *Polimeri* (2005), vol. 26, No. 3, pp. 121-127. Croatian language with English abstract.

Wada, et al., "Photoinduced Film Formation of Colloidal CdSe Quantum Dots", *J. Phys. Chem. C* (2008), vol. 112, pp. 17109-17114.

Warad, et al., "Luminescent nanoparticles of Mn doped ZnS passivated with sodium hexametaphosphate", *Sci. Tech. Adv. Mater.* (2005), vol. 6, pp. 296-301.

Kuno. M., et al., "The band edge luminescence of surface modified Cdse nanocrystallites: Probing the luminescing state", J. Chem. Phys. 105(23) Jun. 15, 1997, pp. 9869-9882.

Tian, et al., "Coupled Composite CdS—CdSe and Core—Shell Types of (CdS)CdSe and (CdSe)CdS Nanoparticles", *J. Phys. Chem.* (1996), vol. 100, No. 21, pp. 8927-8939.

Youn, et al., "Dihexadecyl phosphate, vesicle-stabilized and in situ generated mixed CdS and ZnS semiconductor particles. Preparation and utilization for photosensitized charge separation and hydrogen generation", *J. Phys. Chem.* (1988), vol. 92, pp. 6320-6327.

Search Report issued by the ROC (Taiwan) Intellectual Property Office in ROC (Taiwan) Pat. Appln. No. 101143540, which is the Taiwanese counterpart of the present application, received by foreign associate on Aug. 9, 2016. (English Translation).

\* cited by examiner

Solution Sample including red emitting quantum dots and no Emission Stabilizer

Abs:

PL:

Solution Sample including red emitting quantum dots and
Emission Stabilizer comprising TOPO Abs:

PL:

Solution Sample including red emitting quantum dots and Emission Stabilizer comprising TOPO and Zinc Oleate Abs:

PL:

Solution Sample including green emitting quantum dots
Absorption of the 45% Cd Green sample above:

QUANTUM DOT-CONTAINING COMPOSITIONS INCLUDING AN EMISSION STABILIZER, PRODUCTS INCLUDING SAME, AND METHOD

This application is a continuation of International Application No. PCT/US2012/066151, filed 20 Nov. 2012, which was published in the English language as International Publication No. WO 2013/078252 on 30 May 2013, which International Application claims priority to U.S. Provisional Patent Application No. 61/562,469, filed on 22 Nov. 2011. Each of the foregoing is hereby incorporated herein by reference in its entirety for all purposes.

TECHNICAL FIELD OF THE INVENTION

The present invention relates to technical field of quantum dots, including methods, and compositions and products including same.

BACKGROUND OF THE INVENTION

Many photoluminescent applications of quantum dots require maintaining their solid state external quantum efficiency (also referred to as EQE or external photoluminescent (PL) efficiency) in heat and/or high incident light flux environments. This represents a challenge for EQE maintenance or lifetime of a product including quantum dots dispersed in a host polymer. Both heat and/or high incident light flux can reduce luminance of quantum dots.

Accordingly, preventing, reducing, or inhibiting the destabilization of quantum dots in heat and/or high incident light flux environments would be desirable. Still accordingly, improving or enhancing the stability of the quantum dots and/or luminance of the quantum dots in heat and/or high incident flux environments would be desirable.

SUMMARY OF THE INVENTION

The present invention relates to a composition including quantum dots and an emission stabilizer, products including same, and methods, including methods for improving, or enhancing the emission stability of quantum dots.

In accordance with one aspect of the present invention, there is provided a composition comprising quantum dots and an emission stabilizer. The quantum dots can include one or more ligands attached to a surface thereof.

A composition in accordance with the present invention can include two or more emission stabilizers.

Inclusion of an emission stabilizer in a composition can improve or enhance the stability of at least one emissive property of the quantum dots in the composition against degradation compared to a composition that is the same in all respects except that it does not include the emission stabilizer. Examples of such emissive properties include, by way of example only, lumen output, lumen stability, color point (e.g., CIE x, CIE y) stability, wavelength stability, FWHM of the major peak emission, absorption, solid state EQE, and quantum dot emission efficiency.

Preferably, an emission stabilizer is included in the composition in an amount effective to improve or enhance at least one emissive property of the quantum dots in the composition against degradation.

A composition in accordance with the present invention can further include a host material. A host material can comprise a two or more host materials. Other components can further be optionally included.

In accordance with another aspect of the present invention, there is provided a method for improving the stability of quantum dots in a composition including quantum dots, the method comprising adding an emission stabilizer to the composition in sufficient amount to stabilize at least one emissive property of the quantum dots against degradation.

The quantum dots can include one or more ligands attached to a surface thereof.

A method in accordance with the present invention can include two or more emission stabilizers.

A method in accordance with the present invention preferably includes an emission stabilizer in an amount effective to stabilize the quantum dots in the composition against photodegradation.

A composition included in a method in accordance with the present invention can further include a host material.

In certain embodiments of the present invention including a composition further including a host material, the emission stabilizer is preferably combined with the quantum dots prior to addition to the host material.

In accordance with another aspect of the present invention, there is provided an optical material comprising a composition taught herein.

In accordance with a yet another aspect of the present invention, there is provided an optical component comprising a composition taught herein and a structural member.

In accordance with yet another aspect of the present invention, there is provided an optical component comprising a structural member comprising a composition taught herein.

In accordance with yet another aspect of the present invention, there is provided an optical component comprising a structural member including a hollow portion which contains a composition taught herein.

In accordance with yet another aspect of the present invention, there is provided an optical component comprising a structural member including a surface on or over which a composition taught herein is disposed.

In accordance with yet another aspect of the present invention, there is provided an optical component comprising a structural member and a composition taught wherein the composition is hermetically contained in the optical component.

In accordance with a still further aspect of the present invention, there is provided a light-emitting device comprising a light-emitting element and an optical material arranged to receive and convert at least a portion of light emitted by the light emitting element from a first emission wavelength to one or more predetermined wavelengths, wherein the optical material comprises a composition taught herein.

In accordance with a still further aspect of the present invention, there is provided a backlight member including one or more light-emitting elements (e.g., light emitting diodes) and an optical material arranged to receive and convert at least a portion of light emitted by at least a portion of the one or more light-emitting elements from a first emission wavelength to one or more predetermined wavelengths, wherein the optical material comprises a composition taught herein.

In accordance with yet a still further aspect of the present invention, there is provided a display including one or more light-emitting elements (e.g., light emitting diodes) and an optical material arranged to receive and convert at least a portion of light emitted by at least a portion of the one or more light-emitting elements from a first emission wavelength to one or more predetermined wavelengths, wherein the optical material comprises a composition taught herein.

In accordance with yet a still further aspect of the present invention, there is provided a device including a composition taught herein.

The foregoing, and other aspects and embodiments described herein all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed. Other embodiments will be apparent to those skilled in the art from consideration of the specification and practice of the invention disclosed herein.

Figure 1:
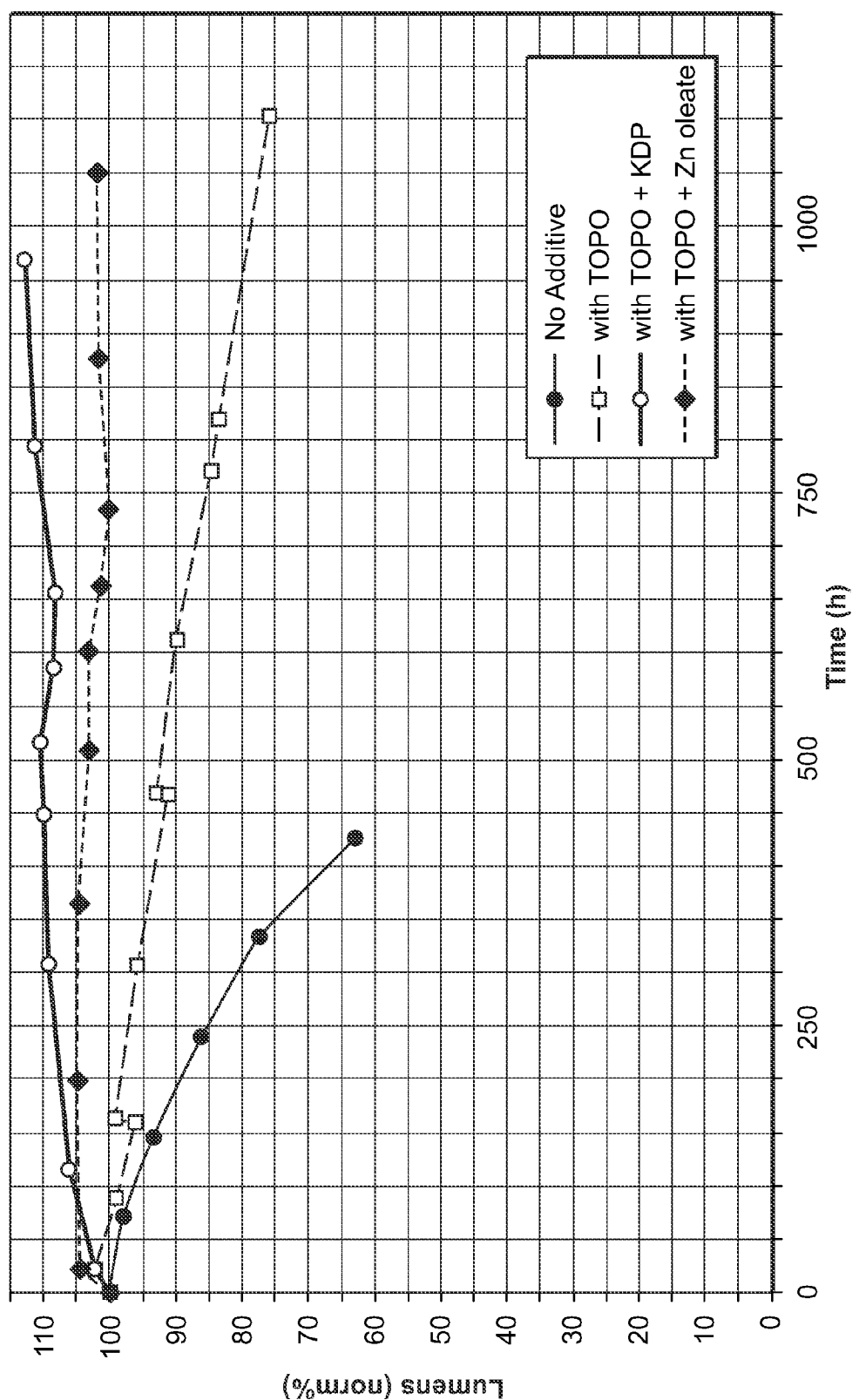
FIG. 1-8 graphically depict test data relating to various examples described in the specification.
Figure 2:
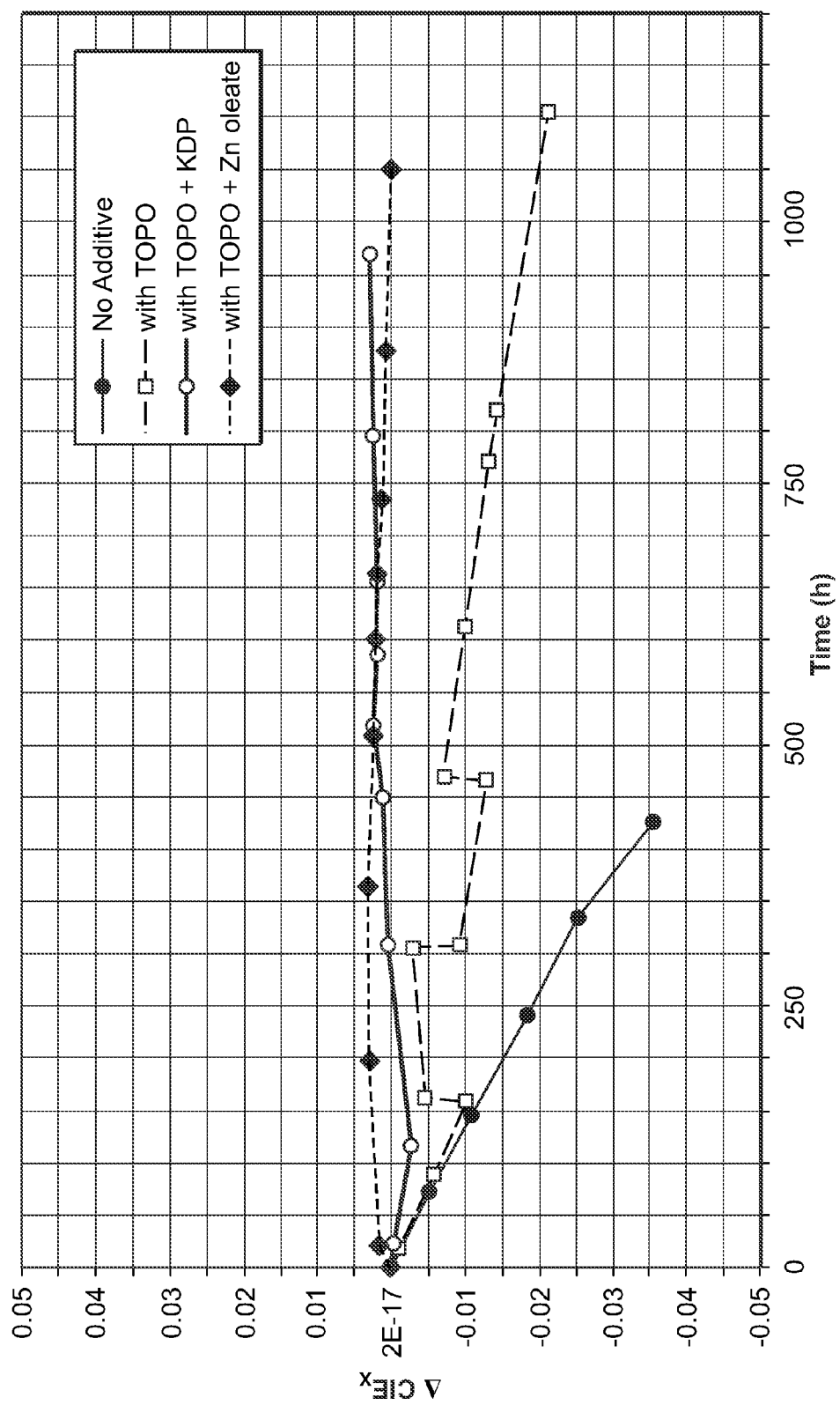
Figure 3:
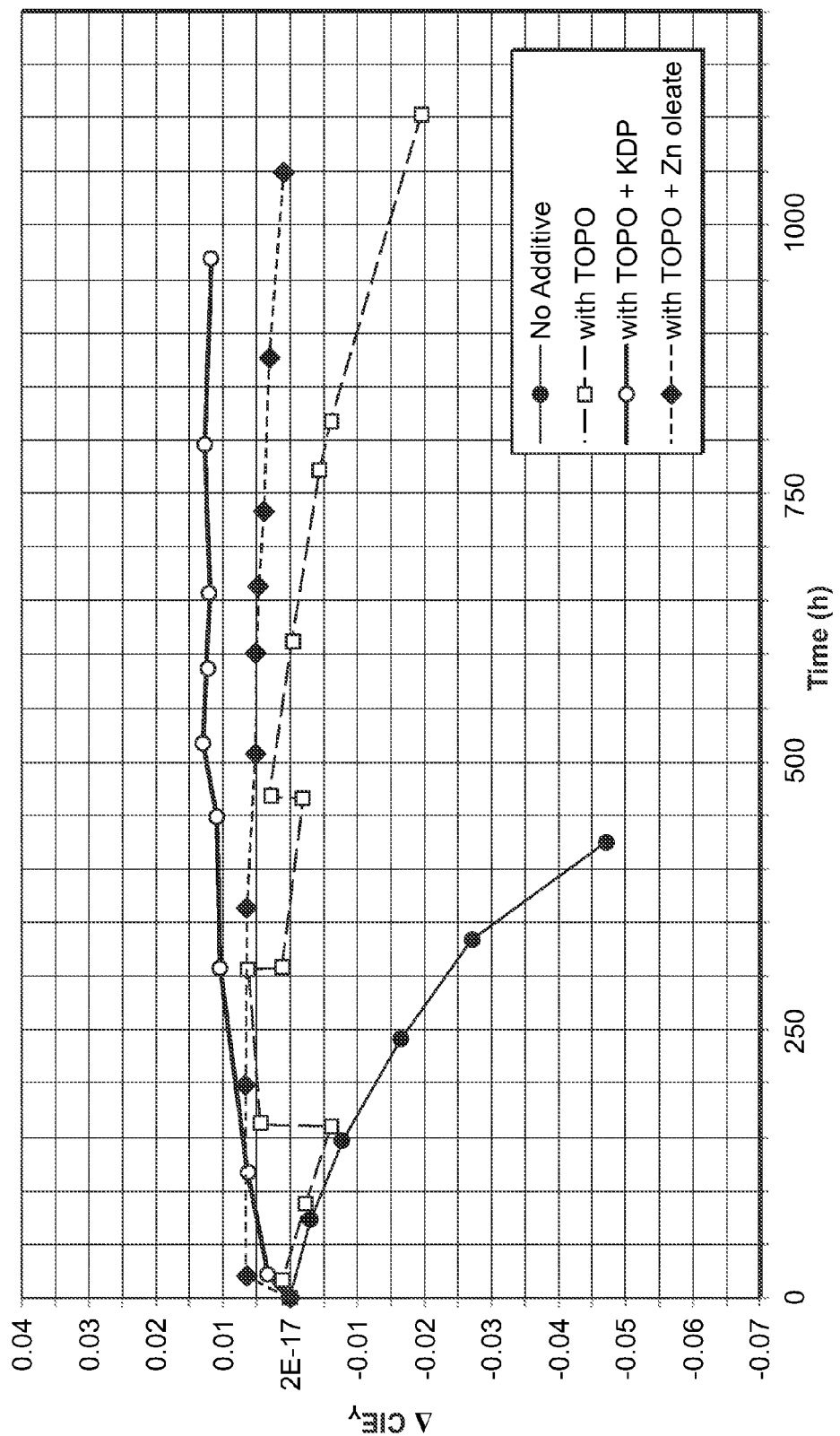
Figure 4:
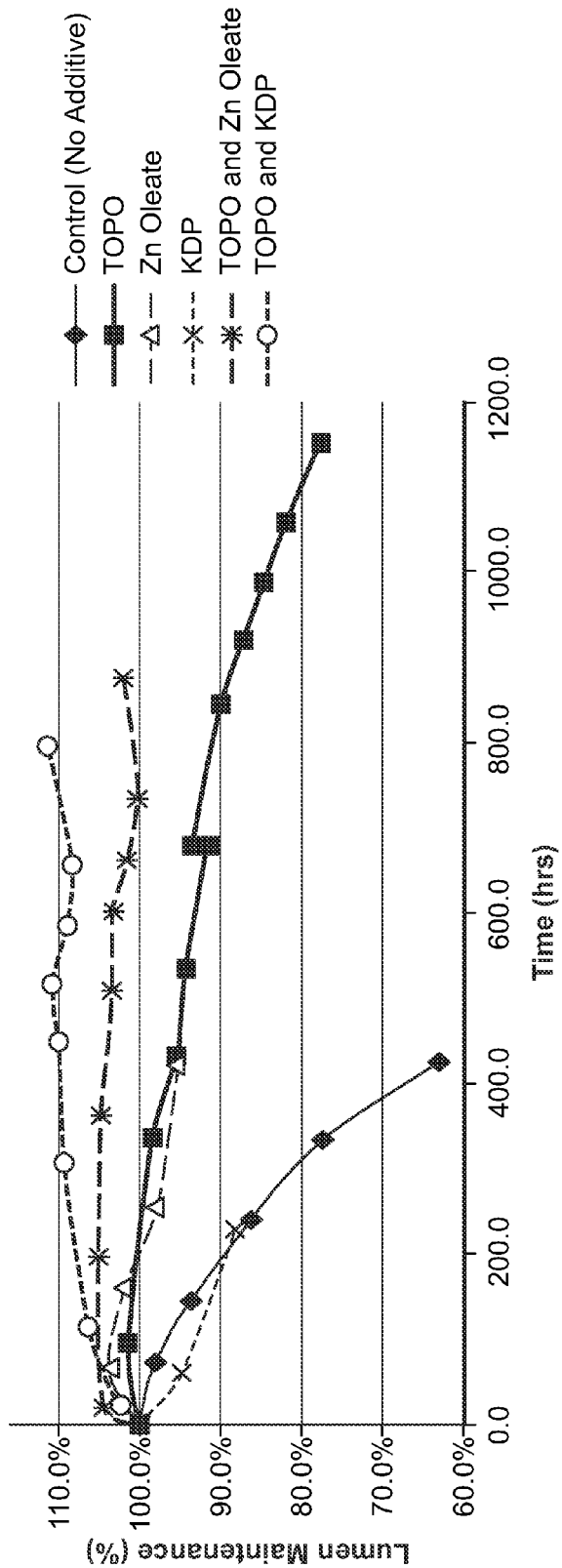

The attached figures are simplified representations presented for purposes of illustration only; the actual structures may differ in numerous respects, particularly including the relative scale of the articles depicted and aspects thereof.

For a better understanding to the present invention, together with other advantages and capabilities thereof, reference is made to the following disclosure and appended claims in connection with the above-described drawings.

DETAILED DESCRIPTION OF THE INVENTION

Various aspects and embodiments of the present inventions will be further described in the following detailed description.

The present invention relates to a composition including quantum dots and an emission stabilizer, products including same, and methods, including methods for improving, or enhancing the emission stability of quantum dots.

In accordance with one aspect of the present invention, there is provided a composition comprising quantum dots and an emission stabilizer.

At least a portion of the quantum dots can further include one or more ligands attached to an outer surface of a quantum dot.

A composition in accordance with the present invention can include two or more emission stabilizers.

Inclusion of an emission stabilizer in a composition can improve or enhance the stability of at least one emissive property of the quantum dots in the composition against degradation compared to a composition that is the same in all respects except that it does not include the emission stabilizer. Examples of such emissive properties include, by way of example only, lumen output, lumen stability, color point (e.g., CIE x. CIE y) stability, wavelength stability, FWHM of the major peak emission, solid state EQE, and quantum dot emission efficiency.

Such stability improvement or enhancement can be observed, for example, by comparing emissive properties of such two comparative compositions after they are exposed to approximately 445 nm incident light flux of approximately ~1.2 W/cm$^2$ blue optical power/LED at a distance of about 0.6 mm from the source of the light flux, where the materials are substantially free of oxygen and water during such exposure.

In certain embodiments, a composition comprises quantum dots and an emission stabilizer, wherein the emission stabilizer stabilizes at least one of the following emissive properties of quantum dots in the composition: lumen output, lumen stability, color point (e.g., CIE x, CIE y) stability, wavelength stability, FWHM of the major peak emission, solid state EQE, and quantum dot emission efficiency.

In certain embodiments, a composition comprises quantum dots and an emission stabilizer, wherein the emission stabilizer stabilizes at least two of the following emissive properties of quantum dots in the composition: lumen output, lumen stability, color point (e.g., CIE x, CIE y) stability, wavelength stability, FWHM of the major peak emission, solid state EQE, and quantum dot emission efficiency.

In certain embodiments, a composition comprises quantum dots and an emission stabilizer, wherein the emission stabilizer stabilizes at least three of the following emissive properties of quantum dots in the composition: lumen output, lumen stability, color point (e.g., CIE x, CIE y) stability, wavelength stability, FWHM of the major peak emission, solid state EQE, and quantum dot emission efficiency.

In certain embodiments, a composition comprises quantum dots and an emission stabilizer, wherein the emission stabilizer stabilizes at least four of the following emissive properties of quantum dots in the composition: lumen output, lumen stability, color point (e.g., CIE x, CIE y) stability, wavelength stability, FWHM of the major peak emission, solid state EQE, and quantum dot emission efficiency.

In certain embodiments, a composition comprises quantum dots and an emission stabilizer, wherein the emission stabilizer stabilizes at least five of the following emissive properties of quantum dots in the composition: lumen output, lumen stability, color point (e.g., CIE x, CIE y) stability, wavelength stability, FWHM of the major peak emission, solid state EQE, and quantum dot emission efficiency.

In certain embodiments, a composition comprises quantum dots and an emission stabilizer, wherein the emission stabilizer stabilizes at least six of the following emissive properties of quantum dots in the composition: lumen output, lumen stability, color point (e.g., CIE x, CIE y) stability, wavelength stability, FWHM of the major peak emission, solid state EQE, and quantum dot emission efficiency.

In certain embodiments, a composition comprises quantum dots and an emission stabilizer, wherein the emission stabilizer stabilizes all of the following emissive properties of quantum dots in the composition: lumen output, lumen stability, color point (e.g., CIE x, CIE y) stability, wavelength stability, FWHM of the major peak emission, solid state EQE, and quantum dot emission efficiency.

Preferably, an emission stabilizer is included in the composition in an amount effective to improve or enhance at least one emissive property of the quantum dots in the composition against degradation.

A composition in accordance with the present invention can further include a host material. A host material can comprise a two or more host materials. Other components can further be optionally included.

In accordance with another aspect of the present invention, there is provided a method for improving the stability of quantum dots in a composition including quantum dots, the method comprising adding an emission stabilizer to the composition in sufficient amount to stabilize at least one emissive property of the quantum dots against degradation.

At least a portion of the quantum dots can further include one or more ligands attached to an outer surface of a quantum dot.

A method in accordance with the present invention can include two or more emission stabilizers.

A method in accordance with the present invention can include emission stabilizer in an amount effective to stabilize the quantum dots in the composition against photodegradation.

A composition included in a method in accordance with the present invention can further include a host material. A host material can comprise a two or more host materials. Other components can further be optionally included.

In certain embodiments of the present invention including a composition further including a host material, the emission stabilizer is preferably combined with the quantum dots prior to addition to the host material.

In accordance with another aspect of the present invention, there is provided an optical material comprising a composition taught herein.

In accordance with a yet another aspect of the present invention, there is provided an optical component comprising a composition taught herein and a structural member.

In accordance with a yet another aspect of the present invention, there is provided an optical component comprising a structural member comprising a composition taught herein.

In accordance with a yet another aspect of the present invention, there is provided an optical component comprising a structural member including a hollow portion which contains a composition taught herein.

In accordance with a yet another aspect of the present invention, there is provided an optical component comprising a structural member including a surface on or over which a composition taught herein is disposed.

In accordance with a yet another aspect of the present invention, there is provided an optical component comprising a structural member and a composition taught wherein the composition is hermetically contained in the optical component.

In accordance with a still further aspect of the present invention, there is provided a light-emitting device comprising a light-emitting element and an optical material arranged to receive and convert at least a portion of light emitted by the light emitting element from a first emission wavelength to one or more predetermined wavelengths, wherein the optical material comprises a composition taught herein.

In accordance with a still further aspect of the present invention, there is provided a backlight member including one or more light-emitting elements (e.g., light emitting diodes) and an optical material arranged to receive and convert at least a portion of light emitted by at least a portion of the one or more light-emitting elements from a first emission wavelength to one or more predetermined wavelengths, wherein the optical material comprises a composition taught herein.

In accordance with yet a still further aspect of the present invention, there is provided a display including one or more light-emitting elements (e.g., light emitting diodes) and an optical material arranged to receive and convert at least a portion of light emitted by at least a portion of the one or more light-emitting elements from a first emission wavelength to one or more predetermined wavelengths, wherein the optical material comprises a composition taught herein.

In accordance with yet a still further aspect of the present invention, there is provided a device including a composition taught herein.

In accordance with additional aspects of the present invention, there are provided methods of improving or enhancing the stability of at least one emissive property of quantum dots in a composition against degradation, for example, due to heat and/or incident light flux. In certain embodiments, for example, the methods can be beneficial to protect quantum dots in a composition against degradation at temperatures up to or in excess of 100° C. and/or under incident light flux>25 mW/cm$^2$.

In accordance with additional aspects of the present invention, there are provided methods of improving or enhancing luminance of quantum dots in a composition against degradation due to heat and/or incident light flux. In certain embodiments, for example, the methods can be beneficial to protect quantum dots in a composition against degradation at temperatures up to or in excess of 100° C. and/or under incident light flux>25 mW/cm$^2$.

In accordance with additional aspects of the present invention, there are provided methods of improving or enhancing the lumen maintenance of quantum dots in a composition under heat and/or incident light flux. In certain embodiments, for example, the methods can increase, improve or enhance the lumen maintenance of quantum dots in a composition under temperature conditions up to and in excess of 100° C. and/or under light flux>25 mW/cm$^2$.

In accordance with additional aspects of the present invention, there are provided methods of preventing, reducing, or inhibiting destabilization of quantum dots within a composition under heat and/or incident light flux. In certain embodiments, for example, the methods can be beneficial to protect quantum dots in a composition against degradation at temperatures up to or in excess of 100° C. and/or under incident light flux>25 mW/cm$^2$.

In accordance with additional aspects of the present invention, there is provided a composition including quantum dots wherein the stability of at least one emissive property of the quantum dot in the composition increased, improved or enhanced against degradation under heat and/or incident light flux. In certain embodiments, for example, such stability can be achieved at temperatures up to or in excess of 100° C. and/or under light flux>25 mW/cm$^2$.

In accordance with additional aspects of the present invention, there is provided a composition including quantum dots wherein the composition has improved wavelength stability under heat and/or incident light flux. In certain embodiments, for example, such stability can be achieved at temperatures up to or in excess of 100° C. and/or under light flux>25 mW/cm$^2$.

In accordance with additional aspects of the present invention, there is provided a composition including quantum dots which have improved CIE color point stability. In certain embodiments, such stability can be achieved at temperatures up to or in excess of 100° C. and/or under light flux>25 mW cm$^2$.

In accordance with additional aspects of the present invention, there is provided a composition including quantum dots which prevent, reduce, or inhibit destabilization of the quantum dots within the composition under heat and/or incident light flux. In certain embodiments, for example, such stability can be achieved at temperatures up to or in excess of 100° C. and/or under light flux>25 mW/cm$^2$.

In accordance with additional aspects of the present invention, there is provided an optical material comprising a composition including quantum dots wherein the stability of at least one emissive property of the quantum dot in the composition increased, improved or enhanced against degradation under heat and/or incident light flux. In certain embodiments, for example, such stability can be achieved at temperatures up to or in excess of 100° C. and/or under light flux>25 mW/cm$^2$.

As discussed above, the compositions of the present invention described herein can be included, for example, in an optical material useful for various solid state lighting applications.

As discussed above, the compositions of the present invention described herein can be included, for example, in an optical material useful for various display applications.

As discussed above, the compositions of the present invention described herein can be included, for example, in an optical material useful in back light units.

The compositions of the present invention described herein can be included, for example, in end-use applications in the photovoltaic field that include quantum dots.

The compositions of the present invention described herein can be included, for example, in end-use applications in the solar field that include quantum dots. The compositions of the present invention described herein can be included, for example, in devices including compositions that include quantum dots.

The compositions of the present invention described herein can be included, for example, in other applications in which quantum dots with increased, improved, or enhanced stability under various heat and/or incident light flux conditions would be desirable.

As discussed above, a composition is provided which includes quantum dots and an emission stabilizer.

Embodiments of the present invention include a composition which includes quantum dots and an emission stabilizer and wherein at least a portion of the quantum dots include one or more ligands attached to an outer surface of a quantum dot.

In certain embodiments, the emission stabilizer and ligands have different chemical compositions. In certain embodiments, the emission stabilizer does not displace the ligands.

Embodiments of the present invention include a composition which includes quantum dots and an emission stabilizer in powder form. At least a portion of the quantum dots therein can further include one or more ligands attached to an outer surface of a quantum dot.

Preferred embodiments of the present invention include compositions including quantum dots and an emission stabilizer, wherein the quantum dots and emission stabilizer are not isolated from each other in the composition by, for example, encapsulating or surrounding the quantum dots in an polymer or other encapsulating material that prevents association of the emission stabilizer with a quantum dot. At least a portion of the quantum dots therein can further include one or more ligands attached to an outer surface of a quantum dot.

Embodiments of the invention include a composition which includes quantum dots, an emission stabilizer, and a host material in which the quantum dots and emission stabilizer are included.

Embodiments of the invention include a composition which includes quantum dots, an emission stabilizer, and a host material in which the quantum dots and emission stabilizer are included, wherein at least a portion of the quantum dots include one or more ligands attached to a surface thereof.

Preferred embodiments of the present invention include compositions including quantum dots, an emission stabilizer, and a host material in which the quantum dots and emission stabilizer are included, wherein the quantum dots and emission stabilizer are not isolated from each other in the composition by, for example, encapsulating or surrounding the quantum dots in an polymer or other encapsulating material that prevents association of the emission stabilizer with a quantum dot. At least a portion of the quantum dots therein can further include one or more ligands attached to an outer surface of a quantum dot.

In the various aspects and embodiments of the present invention described herein, an emission stabilizer can comprise two more emission stabilizers.

In the various aspects and embodiments of the present invention described herein, an emission stabilizer is preferably included in a composition in an amount effective to stabilize at least one emissive property of the quantum dots in the composition against degradation.

Emission stabilizers within the scope of the present invention may be present within a composition in an amount from about 0.01 to about 99 weight percent of the composition, for example, from about 0.01 to about 98 weight percent, from about 0.01 to about 75 weight percent, from about 0.01 to about 50 weight percent, from about 0.01 to about 25 weight percent, from about 0.01 to about 20 weight percent, from about 0.01 to about 15 weight percent, from about 0.01 to about 10 weight percent from about 0.01 to about 5 weight percent, from about 0.1 to about 5 weight percent, from about 0.1 to about 4 weight percent, from about 0.1 to about 3 weight percent, from about 0.1 to about 2 weight percent, from about 0.1 to about 1 weight percent from about 0.5 to about 5 weight percent, from about 0.5 to about 5 weight percent. Other amounts, in addition to these non-limiting examples, may be determined to be useful or desirable.

In certain embodiments, the concentration of quantum dots in the composition is from about 0.1 to about 98 weight percent of the composition.

According to an embodiment of a composition comprising an emission stabilizer and quantum dots (with or without ligands) without the presence of other components, the emission stabilizer may be present in an amount of less than 100% considering the amount of the quantum dots (and possible ligands) in the composition.

Embodiments of the present invention include compositions in which emission stabilizer(s) surround or coat the outer surface of the quantum dots, which preferably further include one or more ligands, thus reducing or preventing undesired interaction of the quantum dot with other species in the composition.

While not wishing to be bound by theory, in certain embodiments it is believed that the emission stabilizer provides a like electrostatic charge at an outer surface of the quantum dots such that a quantum dot having such electrostatically charged outer surface will repel an adjacent quantum dot having a similar electrostatic charge at its outer surface. For example, in a composition further including a host material, quantum dots having charged outer surfaces of like charge will tend to repel each other within the composition. Should conditions of temperature and/or incident light flux tend to cause quantum dot particles to move within the host material, quantum dots having like electrostatically charged outer surfaces of like charge will tend to repel each other thereby stabilizing the quantum dots in the composition and reducing or inhibiting aggregation of quantum dots that may otherwise occur under temperature and/or incident light flux environments. In this manner, the composition will tend to maintain a substantially uniform dispersion of the quantum dots having charged outer surfaces of like charge throughout the host material. Such inhibition of aggregation or maintenance of the dispersion of quantum dots within a host material can substantially maintain the lumen output level of the quantum dots in the composition and increase the lifetime of use. In this manner, a composition is provided which is stabilized by repulsive forces of the quantum dots.

An emission stabilizer within the scope of the present invention can include compounds with a charged or polar or ionizable moiety which forms a charged moiety and a quantum dot interacting moiety. During preparation (e.g., formulating and/or mixing) and formation (e.g., solidifying (e.g., drying, cross-linking, polymerizing, as the case may be) of a composition, the quantum dot interacting moiety of the emission stabilizer can interact with the surface of the quantum dot and therefore can be proximate to the surface of the quantum dot so that the charged or polar or ionizable moiety can be positioned distal to or away from the quantum dot relative to the quantum dot interacting moiety. A plurality of such emission stabilizer molecules positioned at the surface of the quantum dot in the manner described above will result in a charged or polar shell or layer substantially surrounding the quantum dot. The ionizable moiety can be ionized to provide a charged moiety and thus a charged shell or layer. While not wishing to be bound by theory, as discussed above, it is believed that this charged or polar shell or layer on the quantum dot causes electrostatic charge stabilization of the quantum dot by charge repulsion with neighboring or adjacent quantum dots thereby preventing, reducing or inhibiting aggregation or agglomeration of quantum dots during conditions of heat and/or or high incident light flux (e.g., >1 Watt (W)/square centimeter ($cm^2$)) which can result in loss of quantum efficiency, for example, due to Forster resonance energy transfer. In this manner, the dispersion of quantum dots within the composition is substantially maintained and the stability of the quantum dots is increased, improved or enhanced.

According to certain aspects, the quantum dot interacting moiety may interact with the surface of the quantum dot by forces such as ionic, covalent, van der Waals and the like. In addition, the quantum dot interacting moiety may be chemically similar to the surface of the quantum dot or otherwise exhibit an affinity for the surface such that the quantum dot interacting moiety will more likely be attracted to or interact with the surface of the quantum dot during preparation of the composition thereby positioning the emission stabilizer near the surface of the quantum dot with the charged or polar or ionizable moiety positioned distal to or away from the quantum dot to formed the charged or polar shell or layer. Exemplary quantum dot interacting moieties include short chain polymers and moieties having a similar chemical nature to the surface of the quantum dot.

According to certain aspects, the charged or polar moiety may have a full or partial cationic charge or a full or partial anionic charge. The quantum dots within the composition, accordingly, have a charged outer surface resulting in a substantially uniform dispersion of quantum dots which quantum dots are resistant to aggregation or agglomeration such as that which may occur under conditions of heat and/or incident light flux (e.g., >25 milliWatt (mW)/square centimeter ($cm^2$)).

An emission stabilizer within the scope of the present invention includes charged or partially charged or polar compounds. Such a quantum dot will have a charged shell or layer. An example of such an emission stabilizer used during manufacture of the quantum dot includes the conjugate base of 3-phosphonopropionic acid which can bind to the quantum dot and can later be ionized to impart colloidal stability.

Emission stabilizers within the scope of the present invention include anionic surfactants, cationic surfactants, zwitterionic surfactants, and amphoteric surfactants. Other classes of surfactants may also be used.

Examples of anionic surfactants include, but are not limited to, sodium oleyl succinate, ammonium lauryl sulphosuccinate, ammonium lauryl sulphate, sodium dodecylbenzene sulphonate, triethanolamine dodecylbenzene sulphonate, sodium cocoyl isethionate, sodium lauryl isoethionate, sodium N-lauryl sarcosinate and suitable combinations. Additional examples of anionic surfactants include sodium lauryl sulphate, sodium lauryl ether sulphate (n)EO, (where n ranges from 1 to 3), ammonium lauryl sulphate and ammonium lauryl ether sulphate(n)EO, (where n ranges from 1 to 3). Other examples of anionic surfactants are the alkyl sulphates, alkyl ether sulphates, alkaryl sulphonates, alkanoyl isethionates, alkyl succinates, alkyl sulphosuccinates, N-alkyl sarcosinates, alkyl phosphates, alkyl ether phosphates, alkyl ether carboxylates, and alpha-olefin sulphonates, especially their sodium, magnesium, ammonium and mono-, di- and triethanolamine salts.

Examples of cationic surfactants include, but are not limited to, those that contain amino or quaternary ammonium hydrophilic moieties which are positively charged when dissolved in an appropriate composition (e.g., charged whether in aqueous or organic media). Examples of suitable cationic surfactants are those corresponding to the general formula: $[N-(R_1)(R_2)(R_3)(R_4)]^+(X)^-$ in which $R_1$, $R_2$, $R_3$, and $R_4$ are independently selected from (a) an aliphatic group of from 1 to 22 carbon atoms, or (b) an aromatic, alkoxy, polyoxyalkylene, alkylamido, hydroxyalkyl, aryl or alkylaryl group having up to 22 carbon atoms; and X is a salt-forming anion such as those selected from halogen, (e.g. chloride, bromide), acetate, citrate, lactate, glycolate, phosphate nitrate, sulphate, and alkylsulphate radicals. The aliphatic groups can contain, in addition to carbon and hydrogen atoms, ether linkages, and other groups such as amino groups. The longer chain aliphatic groups, e.g., those of about 12 carbons, or higher, can be saturated or unsaturated. Typical monoalkyl quaternary ammonium compounds of use as an emission stabilizer include: (i) lauryl trimethylammonium chloride; cocodimethyl benzyl ammonium chloride (ii) compounds of the general formula: $[N(R_1)(R_2)((CH_2CH_2O)_xH)((CH_2CH_2O)_yH)]^+(X)^-$ in which: x+y is an integer from 2 to 20; $R_1$ is a hydrocarbyl chain having 8 to 14, or a functionalized hydrocarbyl chain with 8 to 14, and containing ether, ester, amido or amino moieties present as substituents or as linkages in the radical chain; $R_2$ is a C1-C3 alkyl group or benzyl group, methyl, and X is a salt-forming anion such as those selected from halogen, (e.g. chloride, bromide), acetate, citrate, lactate, glycolate, phosphate nitrate, sulphate, methosulphate and alkylsulphate radicals. Suitable examples are PEG-n lauryl ammonium chlorides (where n is the PEG chain length), such as PEG-2 cocomonium chloride; PEG-2 cocobenzyl ammonium chloride; PEG-5 cocomonium methosulphate; PEG-15 cocomonium chloride. (iii) compounds of the general formula: $[N(R_1)(R_2)(R_3)((CH_2)_nOH)]^+(X)^-$ in which: n is an integer from 1 to 4; $R_1$ is a hydrocarbyl chain having 8 to 14, $R_2$ and $R_3$ are independently selected from C1-C3 alkyl groups, and X is a salt-forming anion such as those selected from halogen, (e.g. chloride, bromide), acetate, citrate, lactate, glycolate, phosphate nitrate, sulphate, and alkylsulphate radicals. Suitable examples include lauryldimethylhydroxyethylammonium chloride.

Examples of amphoteric and zwitterionic surfactants include alkyl amine oxides, alkyl betaines, alkyl amidopropyl betaines, alkyl sulphobetaines (sultaines), alkyl glycinates, alkyl carboxyglycinates, alkyl amphopropionates, alkylamphoglycinates, alkyl am idopropyl hydroxysultaines, acyl taurates and acyl glutamates, wherein the alkyl and acyl groups have from 8 to 19 carbon atoms. Examples of typical amphoteric and zwitterionic surfactants include lauryl amine oxide, cocodimethyl sulphopropyl betaine and preferably lauryl betaine, cocamidopropyl betaine and sodium cocamphopropionate.

Emission stabilizers within the scope of the present invention include partially charged compounds with a hydrophobic moiety such as hydrophobic phosphine oxides or N-oxides. Exemplary compounds include aliphatic phosphine oxides. More specific examples include, but are not limited to, alkyl phosphine oxides, including but not limited to, tri-n-octyl phosphine oxide (TOPO).

In certain preferred embodiments, an emission stabilizer comprises an aliphatic phosphate-based additive.

Examples of aliphatic phosphate-based additives include, but are not limited to, aliphatic phosphate-based salts. Examples of aliphatic phosphate-based salts include aliphatic phosphate-based salts represented by the formula:

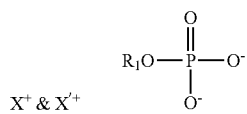

wherein $R_1$ is a straight or branched aliphatic (e.g., an alkyl group having 6 to 34 carbon atoms); and wherein X and X' is hydrogen, cesium, sodium, or potassium, wherein X and X' can be the same or different. In certain embodiments, cesium and/or potassium are preferred. In certain embodiments, X is hydrogen and X' is cesium, sodium or potassium.

Other examples include aliphatic phosphate-based salts including a divalent metal, preferably with an ionic binding energy of at least 100 kJ/mol.

Additional examples of an emission stabilizer comprising an aliphatic phosphate-based salt include those represented by the formula:

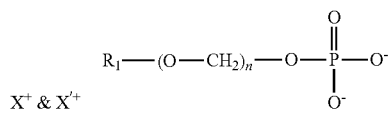

wherein $R_1$ is a straight or branched aliphatic (e.g., an alkyl group having 6 to 34 carbon atoms); and wherein X and X' is hydrogen, cesium, sodium, or potassium, wherein X and X' can be the same or different. In certain embodiments, cesium and/or potassium are preferred. In certain embodiments, X is hydrogen and X' is cesium, sodium or potassium.

Other examples include aliphatic phosphate-based salts including a divalent metal, preferably with an ionic binding energy of at least 100 kJ/mol.

More particular examples of aliphatic phosphate-based salts include, but are not limited to, potassium octyl phosphate, potassium nonyl phosphate, potassium decyl phosphate, potassium undecyl phosphate, potassium lauryl phosphate, potassium myristyl phosphate, potassium cetyl phosphate, potassium stearyl phosphate, dicetyl phosphate, ceteth-10 phosphate, ceteth-20 phosphate, ceteth-30 phosphate, potassium hydrogen octyl phosphate, potassium hydrogen nonyl phosphate, potassium hydrogen decyl phosphate, potassium hydrogen undecyl phosphate, potassium hydrogen lauryl phosphate, potassium hydrogen myristyl phosphate, potassium hydrogen cetyl phosphate, potassium hydrogen stearyl phosphate, dicetyl phosphate, ceteth-10 phosphate, ceteth-20 phosphate, ceteth-30 phosphate, sodium octyl phosphate, sodium nonyl phosphate, sodium decyl phosphate, sodium undecyl phosphate, sodium lauryl phosphate, sodium myristyl phosphate, sodium cetyl phosphate, sodium stearyl phosphate, dicetyl phosphate, ceteth-10 phosphate, ceteth-20 phosphate, ceteth-30 phosphate, sodium hydrogen octyl phosphate, sodium hydrogen nonyl phosphate, sodium hydrogen decyl phosphate, sodium hydrogen undecyl phosphate, sodium hydrogen lauryl phosphate, sodium hydrogen myristyl phosphate, sodium hydrogen cetyl phosphate, sodium hydrogen stearyl phosphate, dicetyl phosphate, ceteth-10 phosphate, ceteth-20 phosphate, ceteth-30 phosphate, cesium octyl phosphate, cesium nonyl phosphate, cesium decyl phosphate, cesium undecyl phosphate, cesium lauryl phosphate, cesium myristyl phosphate, cesium cetyl phosphate, cesium stearyl phosphate, dicetyl phosphate, ceteth-10 phosphate, ceteth-20 phosphate, ceteth-30 phosphate, cesium hydrogen octyl phosphate, cesium hydrogen nonyl phosphate, cesium hydrogen decyl phosphate, cesium hydrogen undecyl phosphate, cesium hydrogen lauryl phosphate, cesium hydrogen myristyl phosphate, cesium hydrogen cetyl phosphate, cesium hydrogen stearyl phosphate, dicetyl phosphate, ceteth-10 phosphate, ceteth-20 phosphate, and/or ceteth-30 phosphate, and mixtures including any of the foregoing.

A preferred aliphatic phosphate-based additive is potassium lauryl phosphate (also known as dipotassium lauryl phosphate).

According to another aspect, an emission stabilizer comprises an aliphatic sulfate-based additive.

Examples of aliphatic sulfate-based additives include, but are not limited to, aliphatic sulfate-based salts. Such additives include an aliphatic sulfate-based additive is represented by the formula:

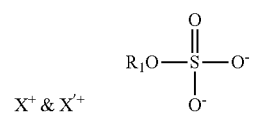

wherein $R_1$ is a straight or branched aliphatic (e.g., an alkyl group having 6 to 34 carbon atoms); and wherein X and X' is hydrogen, cesium, sodium, or potassium, wherein X and X' can be the same or different. In certain embodiments, cesium and/or potassium are preferred. In certain embodiments, X is hydrogen and X' is cesium, sodium or potassium.

Other examples include aliphatic sulfate-based salts including a divalent metal, preferably with an ionic binding energy of at least 100 kJ/mol.

Additional examples of an emission stabilizer comprising an aliphatic sulfate-based salt include those represented by the formula:

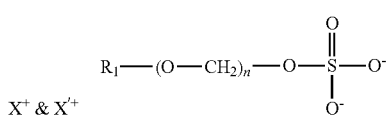

wherein $R_1$ is a straight or branched aliphatic (e.g., an alkyl group having 6 to 34 carbon atoms); and wherein X and X' is hydrogen, cesium, sodium, or potassium, wherein X and X' can be the same or different. In certain embodiments, cesium and/or potassium are preferred. In certain embodiments, X is hydrogen and X' is cesium, sodium or potassium.

Other examples include aliphatic sulfate-based salts including a divalent metal, preferably with an ionic binding energy of at least 100 kJ/mol.

According to another aspect, an emission stabilizer comprises an aliphatic carboxylate-based additive.

Examples of aliphatic carboxylate-based additives include, but are not limited to, aliphatic carboxylate-based salts. Such additives include an aliphatic carboxylate-based additive is represented by the formula:

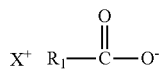

wherein $R_1$ is a straight or branched aliphatic (e.g., an alkyl group having 6 to 34 carbon atoms); and wherein X is cesium, sodium, or potassium. In certain embodiments, cesium and/or potassium are preferred.

Other examples include aliphatic carboxylate, phosphonate, phosphinate, and phosphate-based complex salts including a divalent metal, preferably with an ionic binding energy of at least 100 kJ/mol.

Additional examples of an emission stabilizer comprising an aliphatic carboxylate-based salt include those represented by the formula:

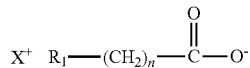

wherein $R_1$ is a straight or branched aliphatic (e.g., an alkyl group having 6 to 34 carbon atoms); and wherein X is cesium, sodium, or potassium. In certain embodiments, cesium and/or potassium are preferred.

Other examples include aliphatic carboxylate, phosphonate, phosphinate, and phosphate-based complex salts including a divalent metal, preferably with an ionic binding energy of at least 100 kJ/mol.

A preferred aliphatic carboxylate-based salt is zinc oleate.

Other examples include divalent metal aliphatic carboxylate-based chelates wherein the divalent metal has an ionic binding energy of at least 100 kJ/mol.

Additional examples of $R_1$ in the formulae of the above described phosphate, sulfate, and carboxylate-based additives or salts include, but are not limited to, aryl, heteroaryl, or a straight or branched hydrocarbon chain (e.g., C2-18) optionally containing at least one double bond, at least one triple bond, or at least one double bond and one triple bond. R can further optionally be substituted, Examples of substitutents include, without limitation, one or more alkyl, alkenyl, alkynyl, alkoxy, hydroxyl, halo, amino, nitro, cyano, C3-5 cycloalkyl, 3-5 membered heterocycloalkyl, aryl, heteroaryl, C1-4 alkylcarbonyloxy, C1-4 alkyloxycarbonyl, C1-4 alkylcarbonyl, or formyl. In example wherein R comprises a hydrocarbon chain, such can be optionally interrupted by $-O-$, $-S-$, $-N(R_a)-$, $-N(R_a)-C(O)-O-$, $-O-C(O)-N(R_a)-$, $-N(R_a)-C(O)-N(R_b)-$, $-O-C(O)-O-$, $-P(R_a)-$, or $-P(O)(R_a)-$. Each of $R_a$ and $R_b$, independently, is hydrogen, alkyl, alkenyl, alkynyl, alkoxy, hydroxylalkyl, hydroxyl, or haloalkyl. An aryl group is a substituted or unsubstituted aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyridyl, pyrrolyl, phenanthryl.

As described above, embodiments of the invention include a composition that can further include a host material.

A host material can be selected based upon the intended end-use application for the composition. According to one aspect, a host material can comprise a flowable host material. Flowable host materials can be useful for applications in which a composition is to be included, for example, in an optical component such as a, such as light transmissive glass tubes or capillaries tubes or other glass containers, which are to be exposed to light. Such compositions can include various amounts of one or more type of quantum dots and one or more host materials. Such compositions can further include one or more scatterers. Other optional additives or ingredients can also be included in a composition. In certain embodiments, a composition can further include one or more photo initiators. One of skill in the art will readily recognize from the present invention that additional ingredients can be included depending upon the particular intended application for the quantum dots.

An optical material or other composition within the scope of the disclosure may include a host material, which may be present in an amount from about 50 weight percent and about 99.5 weight percent, and any weight percent in between whether overlapping or not. In certain embodiments, a host material may be present in an amount from about 80 to about 99.5 weight percent. Examples of specific useful host materials include, but are not limited to, polymers, oligomers, monomers, resins, binders, glasses, metal oxides, and other nonpolymeric materials. Preferred host materials include polymeric and non-polymeric materials that are at least partially transparent, and preferably fully transparent, to preselected wavelengths of light. In certain embodiments, the preselected wavelengths can include wavelengths of light in the visible (e.g., 400-700 nm) region of the electromagnetic spectrum. Preferred host materials include cross-linked polymers and solvent-cast polymers. Examples of other preferred host materials include, but are not limited to, glass or a transparent resin. In particular, a resin such as a non-curable resin, heat-curable resin, or photocurable resin is suitably used from the viewpoint of processability. Specific examples of such a resin, in the form of either an oligomer or a polymer, include, but are not limited to, a melamine resin, a phenol resin, an alkyl resin, an epoxy resin, a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers or oligomers forming these resins, and the like. Other suitable host materials can be identified by persons of ordinary skill in the relevant art.

Host materials can also comprise silicone materials. Suitable host materials comprising silicone materials can be identified by persons of ordinary skill in the relevant art.

In certain embodiments and aspects of the inventions contemplated by this disclosure, a host material comprises a photocurable resin. A photocurable resin may be a preferred host material in certain embodiments, e.g., in embodiments in which the composition is to be patterned. As a photocurable resin, a photo-polymerizable resin such as an acrylic acid or methacrylic acid based resin containing a reactive vinyl group, a photo-crosslinkable resin which generally contains a photo-sensitizer, such as polyvinyl cinnamate, benzophenone, or the like may be used. A heat-curable resin may be used when the photo-sensitizer is not used. These resins may be used individually or in combination of two or more.

In certain embodiments and aspects of the inventions contemplated by this disclosure, a host material can comprise a solvent-cast resin. A polymer such as a polyurethane resin, a maleic resin, a polyamide resin, polymethyl methacrylate, polyacrylate, polycarbonate, polyvinyl alcohol, polyvinylpyrrolidone, hydroxyethylcellulose, carboxymethylcellulose, copolymers containing monomers or oligomers forming these resins, and the like can be dissolved in solvents known to those skilled in the art. Upon evaporation of the solvent, the resin forms a solid host material for the semiconductor nanoparticles.

In certain embodiments, acrylate monomers and/or acrylate oligomers which are commercially available from Radcure and Sartomer can be preferred.

Embodiments of the invention include compositions wherein the host material comprises a material with high dielectric or insulating properties.

Embodiments of the invention include compositions wherein the host material comprises a material with electrically insulating properties.

Embodiments of the invention include compositions in which quantum dots associated with emission stabilizer can be further encapsulated. Nonlimiting examples of encapsulation materials, related methods, and other information that may be useful are described in International Application No. PCT/US2009/01372 of Linton, filed 4 Mar. 2009 entitled "Particles Including Nanoparticles, Uses Thereof, And Methods" and U.S. Patent Application No. 61/240,932 of Nick et al., filed 9 Sep. 2009 entitled "Particles Including Nanoparticles, Uses Thereof, And Methods", each of the foregoing being hereby incorporated herein by reference in its entirety.

The total amount of quantum dots included in an optical material or other composition that includes a host material, such as a for example a polymer, within the scope of the invention is preferably in a range from about 0.01 to about 10 weight percent, and any weight percent in between. An amount in a range from about 0.05 weight percent to about 5 weight percent can be desirable. The amount of quantum dots included in an optical material or other composition can vary within such range depending upon the application and the form in which the quantum dots are included (e.g., film, optics (e.g., capillary), encapsulated film, etc.), which can be chosen based on the particular end application. For instance, when an optic material is used in a thicker capillary with a longer pathlength (e.g., such as in a backlight unit (BLU) for large screen television applications), the concentration of quantum dots can be closer to 0.5%. When an optical material is used in a thinner capillary with a shorter pathlength (e.g., such as in a backlight unit (BLU) for mobile or hand-held applications), the concentration of quantum dots can be closer to 5%.

According to one aspect, the presence of the emission stabilizers described herein provide enhanced stability to quantum dots within a composition even in the presence of impurities from monomers and crosslinkers which may be introduced into the formulation or water which may be present. Accordingly, one aspect of the present invention is a formulation which preferably excludes or substantially excludes reactant impurities or water.

Quantum dots or nanocrystals are nanometer sized semiconductor particles that can have optical properties arising from quantum confinement. Quantum dots can have various shapes, including, but not limited to, sphere, rod, disk, other shapes, and mixtures of various shaped particles. The particular composition(s), structure, and/or size of a quantum dot can be selected to achieve the desired wavelength of light to be emitted from the quantum dot upon stimulation with a particular excitation source. In essence, quantum dots may be tuned to emit light across the visible spectrum by changing their size. See C. B. Murray, C. R. Kagan, and M. G. Bawendi, Annual Review of Material Sci., 2000, 30: 545-610 hereby incorporated by reference in its entirety. The narrow FWHM of quantum dots can result in saturated color emission. The broadly tunable, saturated color emission over the entire visible spectrum of a single material system is unmatched by any class of organic chromophores (see, for example, Dabbousi et al., J. Phys. Chem. 101, 9463 (1997), which is incorporated by reference in its entirety). A monodisperse population of quantum dots will emit light spanning a narrow range of wavelengths.

Exemplary quantum dots include those of the formula MX, where M is a metal from a metal donor and X is a compound from an X donor which is capable of reacting with the metal donor to form a material with the general formula MX. In certain embodiments, the M donor and the X donor can be moieties within the same molecule. The M donor can be an inorganic compound, an organometallic compound, or elemental metal. For example, an M donor can comprise cadmium, zinc, magnesium, mercury, aluminum, gallium, indium or thallium, and the X donor can comprise a compound capable of reacting with the M donor to form a material with the general formula MX. Exemplary metal precursors include dimethylcadmium and cadmium oleate. The X donor can comprise a chalcogenide donor or a pnictide donor, such as a phosphine chalcogenide, a bis(silyl) chalcogenide, dioxygen, an ammonium salt, or a tris(silyl) pnictide. Suitable X donors include, for example, but are not limited to, dioxygen, bis(trimethylsilyl) selenide ($(TMS)_2Se$), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl) telluride ($(TMS)_2Te$), bis(trimethylsilyl)sulfide ($(TMS)_2S$), a trialkyl phosphine sulfide such as (tri-noctylphosphine) sulfide (TOPS), an ammonium salt such as an ammonium halide (e.g., $NH_4Cl$), tris(trimethylsilyl) phosphide ($(TMS)_3P$), tris(trimethylsilyl) arsenide ($(TMS)_3As$), or tris (trimethylsilyl) antimonide ($(TMS)_3Sb$). In certain embodiments, the M donor and the X donor can be moieties within the same molecule.

A quantum dot can comprise one or more semiconductor materials. Examples of semiconductor materials that can be included in a quantum dot (including, e.g., semiconductor nanocrystal) include, but are not limited to, a Group IV element, a Group II-VI compound, a Group II-V compound, a Group III-VI compound, a Group III-V compound, a Group IV-VI compound, a Group compound, a Group II-IV-VI compound, a Group II-IV-V compound, an alloy including any of the foregoing, and/or a mixture including any of the foregoing, including ternary and quaternary mixtures or alloys. A non-limiting list of examples include ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

In certain embodiments, quantum dots can comprise a core comprising one or more semiconductor materials and a shell comprising one or more semiconductor materials, wherein the shell is disposed over at least a portion, and preferably all, of the outer surface of the core. A quantum dot including a core and shell is also referred to as a "core/shell" structure.

For example, a quantum dot can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof. Examples of materials suitable for use as quantum dot cores include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing, including ternary and quaternary mixtures or alloys.

The X donor can comprise a chalcogenide donor where X is a chalcogenide including oxygen, sulfur, selenium, or tellurium, or mixtures thereof. Suitable chalcogenide donors include reactive chalcogenide source, such as highly reactive chalcogenide sources such as $(TMS)_2Se$, $(TMS)_2S$, $H_2S$, chalcogenide mixtures such as octadecene-Se, (ODE/Se), octadecene-S(ODE/S), amine-Se, amine-S and mixtures thereof and secondary phosphine chalcogenides include a secondary phosphine sulfide, a secondary phosphine selenide, a secondary phosphine telluride, or a secondary phosphine oxide or mixtures thereof or mixtures of any of the above.

A shell can be a semiconductor material having a composition that is the same as or different from the composition of the core. The shell can comprise an overcoat including one or more semiconductor materials on a surface of the core. Examples of semiconductor materials that can be included in a shell include, but are not limited to, a Group IV element, a Group II-VI compound, a Group II-V compound, a Group III-VI compound, a Group III-V compound, a Group IV-VI compound, a Group compound, a Group II-IV-VI compound, a Group II-IV-V compound, alloys including any of the foregoing, and/or mixtures including any of the foregoing, including ternary and quaternary mixtures or alloys. Examples include, but are not limited to, ZnO, ZnS, ZnSe, ZnTe, CdO, CdS, CdSe, CdTe, MgS, MgSe, GaAs, GaN, GaP, GaSe, GaSb, HgO, HgS, HgSe, HgTe, InAs, InN, InP, InSb, AlAs, AlN, AlP, AlSb, TlN, TlP, TlAs, TlSb, PbO, PbS, PbSe, PbTe, Ge, Si, an alloy including any of the foregoing, and/or a mixture including any of the foregoing. For example, ZnS, ZnSe or CdS overcoatings can be grown on CdSe or CdTe semiconductor nanocrystals.

In a core/shell quantum dot, the shell or overcoating may comprise one or more layers. The overcoating can comprise at least one semiconductor material which is the same as or different from the composition of the core. Preferably, the overcoating has a thickness from about one to about ten monolayers. An overcoating can also have a thickness greater than ten monolayers. In certain embodiments, more than one overcoating can be included on a core. An example of an overcoating process is described, for example, in U.S. Pat. No. 6,322,901. By adjusting the temperature of the reaction mixture during overcoating and monitoring the absorption spectrum of the core, overcoated materials having high emission quantum efficiencies and narrow size distributions can be obtained.

In certain embodiments, the surrounding "shell" material can have a band gap greater than the band gap of the core material. In certain other embodiments, the surrounding shell material can have a band gap less than the band gap of the core material.

In certain embodiments, the shell can be chosen so as to have an atomic spacing close to that of the "core" substrate. In certain other embodiments, the shell and core materials can have the same crystal structure.

Examples of quantum dot (e.g., semiconductor nanocrystal) (core)shell materials include, without limitation: red (e.g., (CdSe)CdZnS (core)shell), green (e.g., (CdZnSe) CdZnS (core)shell, etc.), and blue (e.g., (CdS)CdZnS (core) shell).

Quantum dots can have various shapes, including, but not limited to, sphere, rod, disk, other shapes, and mixtures of various shaped particles.

Methods of making quantum dots are known. One example of a method of manufacturing a quantum dot (including, for example, but not limited to, a semiconductor nanocrystal) is a colloidal growth process. Colloidal growth occurs by injection an M donor and an X donor into a hot coordinating solvent. One example of a preferred method for preparing monodisperse quantum dots comprises pyrolysis of organometallic reagents, such as dimethyl cadmium, injected into a hot, coordinating solvent. This permits discrete nucleation and results in the controlled growth of macroscopic quantities of quantum dots. The injection produces a nucleus that can be grown in a controlled manner to form a quantum dot. The reaction mixture can be gently heated to grow and anneal the quantum dot. Both the average size and the size distribution of the quantum dots in a sample are dependent on the growth temperature. The growth temperature for maintaining steady growth increases with increasing average crystal size. Resulting quantum dots are members of a population of quantum dots. As a result of the discrete nucleation and controlled growth, the population of quantum dots that can be obtained has a narrow, monodisperse distribution of diameters. The monodisperse distribution of diameters can also be referred to as a "size". Preferably, a monodisperse population of particles includes a population of particles wherein at least about 60% of the particles in the population fall within a specified particle size range. A population of monodisperse particles preferably deviate less than 15% rms (root-mean-square) in diameter and more preferably less than 10% rms and most preferably less than 5%.

According to certain methods of making quantum dots, the liquid medium includes solvents such as coordinating solvents. A coordinating solvent can help control the growth of the quantum dot. Alternatively, non-coordinating solvents can also be used in certain applications. A coordinating solvent is a compound having a donor lone pair, for example, a lone electron pair available to coordinate to a surface of the growing quantum dot (including, e.g., a semiconductor nanocrystal). Solvent coordination can stabilize the growing quantum dot. Examples of coordinating solvents include alkyl phosphines, alkyl phosphine oxides, alkyl phosphonic acids, or alkyl phosphinic acids, however, other coordinating solvents, such as pyridines, furans, and amines may also be suitable for the quantum dot (e.g., semiconductor nanocrystal) production. Additional examples of suitable coordinating solvents include pyridine, tri-n-octyl phosphine (TOP), tri-n-octyl phosphine oxide (TOPO) and trishydroxylpropylphosphine (tHPP), tributylphosphine, tri(dodecyl)phosphine, dibutyl-phosphite, tributyl phosphite, trioctadecyl phosphite, trilauryl phosphite, tris(tridecyl) phosphite, triisodecyl phosphite, bis(2-ethylhexyl)phosphate, tris(tridecyl) phosphate, hexadecylamine, oleylamine, octadecylamine, bis(2-ethylhexyl)amine, octylamine, dioctylamine, trioctylamine, dodecylamine/laurylamine, didodecylamine tridodecylamine, hexadecylamine, dioctadecylamine, trioctadecylamine, phenylphosphonic acid, hexylphosphonic acid, tetradecylphosphonic acid, octylphosphonic acid, octadecylphosphonic acid, propylenediphosphonic acid, phenylphosphonic acid, aminohexylphosphonic acid, dioctyl ether, diphenyl ether, methyl myristate, octyl octanoate, N-dodecylpyrrolidone (NDP), and hexyl octanoate. In certain embodiments, technical grade TOPO can be used.

The narrow size distribution of the quantum dots (including, e.g., semiconductor nanocrystals) allows the possibility of light emission in narrow spectral widths. Monodisperse semiconductor nanocrystals have been described in detail in Murray et al. (J. Am. Chem. Soc., 115:8706 (1993)); and in the thesis of Christopher Murray, entitled "Synthesis and Characterization of II-VI Quantum Dots and Their Assembly into 3-D Quantum Dot Superlattices", Massachusetts Institute of Technology, September, 1995. The foregoing are hereby incorporated herein by reference in their entireties.

The process of controlled growth and annealing of the quantum dots in the coordinating solvent that follows nucleation can also result in uniform surface derivatization and regular core structures. As the size distribution sharpens, the temperature can be raised to maintain steady growth. By adding more M donor or X donor, the growth period can be shortened. Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals. For example, for CdSe and CdTe, by stopping growth at a particular semiconductor nanocrystal average diameter and choosing the proper composition of the semiconducting material, the emission spectra of the semiconductor nanocrystals can be tuned continuously over the wavelength range of 300 nm to 5 microns, or from 400 nm to 800 nm.

Size distribution during the growth stage of the reaction can be estimated by monitoring the absorption or emission line widths of the particles. Modification of the reaction temperature in response to changes in the absorption spectrum of the particles allows the maintenance of a sharp particle size distribution during growth. Reactants can be added to the nucleation solution during crystal growth to grow larger crystals. For example, for CdSe and CdTe, by stopping growth at a particular semiconductor nanocrystal average diameter and choosing the proper composition of the semiconducting material, the emission spectra of the semiconductor nanocrystals can be tuned continuously over the wavelength range of 300 nm to 5 microns, or from 400 nm to 800 nm.

The particle size distribution of the quantum dots (including, e.g., semiconductor nanocrystals) can be further refined by size selective precipitation with a poor solvent for the quantum dots, such as methanol/butanol. For example, quantum dots can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected quantum dot (e.g., semiconductor nanocrystal) population preferably has no more than a 15% rms deviation from mean diameter, more preferably 10% rms deviation or less, and most preferably 5% rms deviation or less.

Semiconductor nanocrystals and other types of quantum dots preferably have ligands attached thereto. According to one aspect, quantum dots within the scope of the present invention include green CdSe quantum dots having oleic acid ligands and red CdSe quantum dots having oleic acid ligands. Alternatively, or in addition, octadecylphosphonic acid ("ODPA") ligands may be used instead of oleic acid ligands. The ligands promote solubility of the quantum dots in the polymerizable composition which allows higher loadings without agglomeration which can lead to red shifting.

Ligands can be derived from a coordinating solvent that may be included in the reaction mixture during the growth process. Ligands can be added to the reaction mixture. Ligands can be derived from a reagent or precursor included in the reaction mixture for synthesizing the quantum dots. Ligands can be exchanged with ligands on the surface of a quantum dot. In certain embodiments, quantum dots can include more than one type of ligand attached to an outer surface.

According to one aspect of the present invention, quantum dots described herein include aliphatic ligands attached thereto. Such aliphatic ligands promote adhesion with a carrier particle. Such aliphatic ligands promote solubility or dispersability of the quantum dots bound to the carrier particles in a curable or polymerizable host material. According to one aspect, exemplary ligands include oleic acid ligands and octadecylphosphonic acid ("ODPA") ligands.

Ligands can be derived from a coordinating solvent that may be included in the reaction mixture during the growth process. Alternatively, ligands can be added to the reaction mixture or ligands can be derived from a reagent or precursor included in the reaction mixture for synthesizing the quantum dots. In certain embodiments, quantum dots can include more than one type of ligand attached to an outer surface.

A quantum dot surface that includes ligands derived from the growth process or otherwise can be modified by repeated exposure to an excess of a competing ligand group (including, e.g., but not limited to, a coordinating group) to form an overlayer. For example, a dispersion of the capped quantum dots can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanoparticle, including, for example, but not limited to, phosphines, thiols, amines and phosphates.

For example, a quantum dot can be exposed to short chain polymers which exhibit an affinity for the surface and which terminate in a moiety having an affinity for a suspension or dispersion medium. Such affinity improves the stability of the suspension and discourages flocculation of the quantum dot. Examples of additional ligands include alkyl phosphines, alkyl phosphine oxides, alkyl phosphonic acids, or alkyl phosphinic acids, pyridines, furans, and amines. More specific examples include, but are not limited to, pyridine, tri-n-octyl phosphine (TOP), tri-n-octyl phosphine oxide (TOPO), tris-hydroxylpropylphosphine (tHPP) and octadecylphosphonic acid ("ODPA"). Technical grade TOPO can be used.

Suitable coordinating ligands can be purchased commercially or prepared by ordinary synthetic organic techniques, for example, as described in J. March, Advanced Organic Chemistry, which is incorporated herein by reference in its entirety.

The emission from a quantum dot capable of emitting light can be a narrow Gaussian emission band that can be tuned through the complete wavelength range of the ultraviolet, visible, or infra-red regions of the spectrum by varying the size of the quantum dot, the composition of the quantum dot, or both. For example, a semiconductor nanocrystal comprising CdSe can be tuned in the visible region; a semiconductor nanocrystal comprising InAs can be tuned in the infra-red region. The narrow size distribution of a population of quantum dots capable of emitting light can result in emission of light in a narrow spectral range. The population can be monodisperse and preferably exhibits less than a 15% rms (root-mean-square) deviation in diameter of such quantum dots, more preferably less than 10%, most preferably less than 5%. Spectral emissions in a narrow range of no greater than about 75 nm, preferably no greater than about 60 nm, more preferably no greater than about 40 nm, and most preferably no greater than about 30 nm full width at half max (FWHM) for such quantum dots that emit in the visible can be observed. IR-emitting quantum dots can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of the light-emitting quantum dot diameters decreases.

Quantum dots can have emission quantum efficiencies such as between 0% to greater than 95%, for example in solution, such as greater than 10%, 20%, 30%, 40%, 50%, 60%, 70%, 80%, or 90%.

The narrow FWHM of quantum dots can result in saturated color emission. The broadly tunable, saturated color emission over the entire visible spectrum of a single material system is unmatched by any class of organic chromophores (see, for example, Dabbousi et al., J, Phys. Chem. 101, 9463 (1997), which is incorporated by reference in its entirety). A monodisperse population of quantum dots will emit light spanning a narrow range of wavelengths.

In certain embodiments of the present invention, quantum dots that emit wavelengths characteristic of red light are desirable. In certain preferred embodiments, quantum dots capable of emitting red light emit light having a peak center wavelength in a range from about 615 nm to about 635 nm, and any wavelength in between whether overlapping or not. For example, the quantum dots can be capable or emitting red light having a peak center wavelength of about 630 nm, of about 625 nm, of about 620 nm, of about 615 nm.

In certain embodiments of the present invention, quantum dots that emit wavelength characteristic of green light are desirable. In certain preferred embodiments, quantum dots capable of emitting green light emit light having a peak center wavelength in a range from about 520 nm to about 545 nm, and any wavelength in between whether overlapping or not. For example, the quantum dots can be capable or emitting green light having a peak center wavelength of about 520 nm, of about 525 nm, of about 535 nm, of about 540 nm.

According to further aspects of the present invention, the quantum dots exhibit a narrow emission profile in the range of between about 20 nm and about 60 nm at full width half maximum (FWHM). The narrow emission profile of quantum dots of the present invention allows the tuning of the quantum dots and mixtures of quantum dots to emit saturated colors thereby increasing color gamut and power efficiency beyond that of conventional LED lighting displays. According to one aspect, green quantum dots designed to emit a predominant wavelength of, for example, about 523 nm and having an emission profile with a FWHM of about, for example, 37 nm are combined, mixed or otherwise used in combination with red quantum dots designed to emit a predominant wavelength of about, for example, 617 nm and having an emission profile with a FWHM of about, for example 32 nm. Such combinations can be stimulated by blue light to create trichromatic white light.

The quantum dots used in a formulation, optical material, or other composition are selected based on the desired peak emission wavelength or combinations of wavelengths desired for the particular intend end-use application for the formulation, optical material, or other composition.

When quantum dots that emit light with peak emission wavelengths that differ from that of other quantum dots included in a particular embodiments, the amounts of each are selected based on the desired light out-put. Such determination can be readily made by the person of ordinary skill in the relevant art. For example, the ratio of quantum dots with different peak emissions that are used in an optical material is determined by the emission peaks of the quantum dots used. For example, when quantum dots capable of emitting green light having a peak center wavelength in a range from about 514 nm to about 540 nm, and any wavelength in between whether overlapping or not, and quantum dots capable of emitting red light having a peak center wavelength in a range from about 615 nm to about 640 nm, and any wavelength in between whether overlapping or not, are used in an optical material, the ratio of the weight percent green-emitting quantum dots to the weight percent of red-emitting quantum dots can be in a range from about 12:1 to about 1:1, and any ratio in between whether overlapping or not.

The above ratio of weight percent green-emitting quantum dots to weight percent red-emitting quantum dots in an optical material can alternatively be presented as a molar ratio. For example, the above weight percent ratio of green to red quantum dots range can correspond to a green to red quantum dot molar ratio in a range from about 24.75 to 1 to about 5.5 to 1, and any ratio in between whether overlapping or not.

The ratio of the blue to green to red light output intensity in white trichromatic light emitted by a quantum dot containing BLU described herein including blue-emitting solid state inorganic semiconductor light emitting devices (having blue light with a peak center wavelength in a range from about 450 nm to about 460 nm, and any wavelength in between whether overlapping or not), and an optical material including mixtures of green-emitting quantum dots and red-emitting quantum dots within the above range of weight percent ratios can vary within the range. For example, the ratio of blue to green light output intensity therefor can be in a range from about 0.75 to about 4 and the ratio of green to red light output intensity therefor can be in a range from about 0.75 to about 2.0. In certain embodiments, for example, the ratio of blue to green light output intensity can be in a range from about 1.4 to about 2.5 and the ratio of green to red light output intensity can be in a range from about 0.9 to about 1.3.

Scatterers, also referred to as scattering agents, within the scope of the disclosure may be present, for example, in an amount of between about 0.01 weight percent and about 1 weight percent. Amounts of scatterers outside such range may also be useful. Examples of light scatterers (also referred to herein as scatterers or light scattering particles) that can be used in the embodiments and aspects of the inventions described herein, include, without limitation, metal or metal oxide particles, air bubbles, and glass and polymeric beads (solid or hollow). Other light scatterers can be readily identified by those of ordinary skill in the art. In certain embodiments, scatterers have a spherical shape. Preferred examples of scattering particles include, but are not limited to, $TiO_2$, $SiO_2$, $BaTiO_3$, $BaSO_4$, and ZnO. Particles of other materials that are non-reactive with the host material and that can increase the absorption pathlength of the excitation light in the host material can be used. In certain embodiments, light scatterers may have a high index of refraction (e.g., $TiO_2$, $BaSO_4$, etc) or a low index of refraction (gas bubbles).

Selection of the size and size distribution of the scatterers is readily determinable by those of ordinary skill in the relevant art. The size and size distribution can be based upon the refractive index mismatch of the scattering particle and the host material in which the light scatterers are to be dispersed, and the preselected wavelength(s) to be scattered according to light scattering theory, e.g., Rayleigh or Mie scattering theory. The surface of the scattering particle may further be treated to improve dispersability and stability in the host material. In one embodiment, the scattering particle comprises $TiO_2$ (R902+ from DuPont) having a 0.405 µm median particle size in a concentration in a range from about 0.01 to about 1% by weight.

The amount of scatterers in a formulation is useful in applications where the formulation may be in the form of an ink is contained in a clear vessel having edges to limit losses due the total internal reflection. The amount of the scatterers may be altered relative to the amount of quantum dots used in the formulation. For example, when the amount of the scatter is increased, the amount of quantum dots may be decreased.

Examples of thixotropes which may be included in a quantum dot formulation, also referred to as rheology modifiers, include, but are not limited to, fumed metal oxides (e.g., fumed silica which can be surface treated or untreated (such as Cab-O-Sil™ fumed silica products available from Cabot Corporation), or fumed metal oxide gels (e.g., a silica gel). An optical material can include an amount of thixotrope in a range from about 5 to about 12 weight percent. Other amounts outside the range may also be determined to be useful or desirable.

In certain embodiments, a formulation including quantum dots and a host material can be formed from an ink comprising quantum dots and a liquid vehicle, wherein the liquid vehicle comprises a composition including one or more functional groups or units that are capable of being cross-linked. The functional units can be cross-linked, for example, by UV treatment, thermal treatment, or another cross-linking technique readily ascertainable by a person of ordinary skill in a relevant art. In certain embodiments, the composition including one or more functional groups that are capable of being cross-linked can be the liquid vehicle itself. In certain embodiments, it can be a co-solvent. In certain embodiments, it can be a component of a mixture with the liquid vehicle.

One particular example of a preferred method of making an ink is as follows. A solution including quantum dots having the desired emission characteristics well dispersed in an organic solvent is concentrated to the consistency of a wax by first stripping off the solvent under nitrogen/vacuum until a quantum dot containing residue with the desired consistency is obtained. The desired resin monomer is then added under nitrogen conditions, until the desired monomer to quantum dot ratio is achieved. This mixture is then vortex mixed under oxygen free conditions until the quantum dots are well dispersed. The final components of the resin are then added to the quantum dot dispersion, and are then sonicated mixed to ensure a fine dispersion.

A tube or capillary comprising an optical material prepared from such finished ink can be prepared by then introducing the ink into the tube via a wide variety of methods, and then UV cured under intense illumination for some number of seconds for a complete cure.

In certain aspects and embodiments of the inventions taught herein, the optic including the cured quantum dot containing ink is exposed to light flux for a period of time sufficient to increase the photoluminescent efficiency of the optical material.

In certain embodiments, the optical material is exposed to light and heat for a period of time sufficient to increase the photoluminescent efficiency of the optical material.

In preferred certain embodiments, the exposure to light or light and heat is continued for a period of time until the photoluminescent efficiency reaches a substantially constant value.

In one embodiment, for example, after the optic, i.e. tube or capillary, is filled with quantum dot containing ink, cured, and sealed (regardless of the order in which the curing and sealing steps are conducted), the optic is exposed, to 25-35 mW/cm² light flux with a wavelength in a range from about 365 nm to about 470 nm, while at a temperature in a range from about 25 to 80° C., for a period of time sufficient to increase the photoluminescent efficiency of the ink. In one embodiment, for example, the light has a wavelength of about 450 nm, the light flux is 30 mW/cm², the temperature 80° C., and the exposure time is 3 hours.

In general, quantum dots according to the present invention can have an average particle size in a range from about 1 to about 1000 nanometers (nm), and preferably in a range from about 1 to about 100 nm. In certain embodiments, quantum dots have an average particle size in a range from about 1 to about 20 nm (e.g., such as about 5, 6, 7, 8, 9, 10, 11, 12, 13, 14, 15, 16, 17, 18, 19, or 20 nm). In certain embodiments, quantum dots have an average particle size in a range from about 1 nm to about 20 nm or about 1 nm to about 10 nm. Quantum dots can have an average diameter less than about 150 Angstroms (Å). In certain embodiments, quantum dots having an average diameter in a range from about 12 to about 150 Å can be particularly desirable. However, depending upon the composition, structure, and desired emission wavelength of the quantum dot, the average diameter may be outside of these ranges.

The particle size distribution of the quantum dots (including, e.g., semiconductor nanocrystals) can be further refined by size selective precipitation with a poor solvent for the quantum dots, such as methanol/butanol. For example, quantum dots can be dispersed in a solution of 10% butanol in hexane. Methanol can be added drop wise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected quantum dot (e.g., semiconductor nanocrystal) population preferably has no more than a 15% rms deviation from mean diameter, more preferably 10% rms deviation or less, and most preferably 5% rms deviation or less.

Embodiments of the invention include an optical material comprising a composition taught herein.

Embodiments of the invention further include an optical component comprising a composition in accordance with the present invention.

An optical component can further include a structural member that supports or contains the composition. Such structural member can have a variety of different shapes or configurations. For example, it can be planar, curved, convex, concave, hollow, linear, circular, square, rectangular, oval, spherical, cylindrical, or any other shape or configuration that is appropriate based on the intended end-use application and design. An example of a common structural component is a substrate such as a plate-like member or a tubular-like structural member.

An optical material can be disposed on a surface of a structural member.

In certain embodiments, the optical component further includes a substrate having a surface on which the optical material is disposed. In certain embodiments, the optical material is at least partially encapsulated between opposing substrates.

In certain preferred embodiments, the composition is fully encapsulated between opposing substrates that are sealed together by a seal. In certain embodiments, one or both of the substrates comprise glass.

In certain embodiments, the seal comprises an edge or perimeter seal. In certain embodiments, the seal comprises barrier material. In certain embodiments, the seal comprises an oxygen barrier. In certain embodiments, the seal comprises a water barrier. In certain embodiments, the seal comprises an oxygen and water barrier. In certain embodiments, the seal is substantially impervious to water and/or oxygen.

In another example, an optical component can comprise a composition included within a structural member. For example, the composition can be included in a hollow or cavity portion of a tubular-like structural member (e.g., a tube, hollow capillary, hollow fiber, etc.) that can be open at either or both ends. Preferably open end(s) of the member are hermetically sealed after the composition is included therein. Examples of sealing techniques include but are not limited to, (1) contacting an open end of a tube with an epoxy, (2) drawing the epoxy into the open end due to shrinkage action of a curing resin, or (3) covering the open end with a glass adhering metal such as a glass adhering solder or other glass adhering material, (4) hot glue; and (5) melting the open end by heating the glass above the melting point of the glass and pinching the walls together to close the opening to form a molten glass hermetic seal.

Other suitable techniques can be used for sealing the ends or edges of the capillary.

Other designs, configurations, and combinations of barrier materials and/or structural members comprising barrier materials can be included in an optical component in which the optical material is at least partially encapsulated. Such designs, configurations, and combinations can be selected based on the intended end-use application and design.

A structure member is preferably optically transparent to permit light to pass into and/or out of the composition that it may encapsulate.

The configuration and dimensions of an optical component can be selected based on the intended end-use application and design.

An optical component comprising a structural member in which the composition is hermetically contained can be preferred An optical component can further include one or more barrier materials which can be selected to protect the composition from environmental effects (e.g., oxygen and/or water) which may be detrimental for a given end-use application.

In order to facilitate disposing or including a composition on or in a structural member, a composition including a host material that is photopolymerizable can be desirable. For example, the composition in the form of a fluid can be placed within a structural member comprising a tube or other container and then one or both ends sealed with the tube being hermetically sealed to avoid oxygen being within the tube. Alternatively, the formulation or composition can be disposed between opposing plates and/or sheets with the perimeter edges being hermetically sealed. The polymerizable composition can then be subjected to light of sufficient intensity and for a period of time sufficient to polymerize the polymerizable composition, and in one aspect, in the absence of oxygen. In certain embodiments, for example, the period of time can range between about 10 seconds to about 6 minutes or between about 1 minute to about 6 minutes. According to one embodiment, the period of time is sufficiently short to avoid agglomeration of the quantum dots prior to formation of a polymerized matrix. Agglomeration can result in FRET and subsequent loss of photoluminescent performance.

A host material can include a combination of one or more polymerizable host materials. According to one aspect, the polymerizable material avoids, resists or inhibits yellowing when in the form of a polymer. A polymer or other material in which quantum dots are dispersed may also be referred to herein as a host material. Host materials include polymeric and non-polymeric materials that are at least partially transparent, and preferably fully transparent, to preselected wavelengths of light.

According to an additional aspect, a polymerizable host material is selected so as to provide sufficient ductility to the polymerized material. Ductility can be advantageous in relieving stress on thin walled glass tubes that can occur during polymer shrinkage when the polymer is cured. Suitable polymerizable materials can act as solvents for the quantum dots and so combinations of polymerizable host materials can be selected based on solvent properties for various quantum dots.

Polymerizable host materials include monomers and oligomers and polymers and mixtures thereof. Exemplary monomers include lauryl methacrylate, norbornyl methacrylate, Ebecyl 150 (Cytec), CD590 (Cytec) and the like. Polymerizable materials can be present in the polymerizable formulation in an amount greater than 50 weight percent. Examples include amounts in a range greater than 50 to about 99.5 weight percent, greater than 50 to about 98 weight percent, greater than 50 to about 95 weight percent, from about 80 to about 99.5 weight percent, from about 90 to about 99.95 weight percent, from about 95 to about 99.95 weight percent. Other amounts outside these examples may also be determined to be useful or desirable.

Exemplary polymerizable compositions further include one or more of a crosslinking agent, a scattering agent, a rheology modifier, a filler, and a photoinitiator.

Suitable crosslinking agents include ethylene glycol dimethacrylate Ebecyl 150 and the like. Crosslinking agents can be present in the polymerizable formulation in an amount between about 0.5 wt % and about 30.0 wt %. In certain embodiments, crosslinking agents can be present in the polymerizable formulation in an amount between about 0.5 wt % and about 3.0 wt %. Crosslinking agents are generally added, for example in an amount of 1% w/w, to improve stability and strength of a polymer which helps avoid cracking of the polymer due to shrinkage upon curing of the polymer.

Suitable scattering agents include $TiO_2$, alumina, barium sulfate, PTFE, barium titanate and the like. Scattering agents can be present in the polymerizable formulation in an amount between about 0.05 wt % and about 1.0 wt %. Scattering agents are generally added, for example in a preferred amount of about 0.15% w/w, to promote outcoupling of emitted light.

Suitable rheology modifiers (thixotropes) include fumed silica commercially available from Cabot Corporation such as TS-720 treated fumed silica, treated silica commercially available from Cabot Corporation such as TS720, TS500, TS530, TS610 and hydrophilic silica such as M5 and EHS commercially available from Cabot Corporation. Rheology modifiers can be present in the polymerizable formulation in an amount between about 5% w/w to about 12% w/w. Rheology modifiers or thixotropes act to lower the shrinkage of the polymer or resin and help prevent cracking. Hydrophobic rheology modifiers disperse more easily and build viscosity at higher loadings allowing for more filler content and less shrinkage to the point where the formulation becomes too viscous to fill the tube. Rheology modifiers such as fumed silica also provide higher EQE and help to prevent settling of $TiO_2$ on the surface of the tube before polymerization has taken place.

Suitable fillers include silica, fumed silica, precipitated silica, glass beads, PMMA beads and the like. Fillers can be present in the polymerizable formulation in an amount between about 0.01% and about 60%, about 0.01% and about 50%, about 0.01% and about 40%, about 0.01% and about 30%, about 0.01% and about 20% and any value or range in between whether overlapping or not.

Suitable photoinitiators include Irgacure 2022, KTO-46 (Lambert), Esacure 1 (Lambert) and the like. Photoinitiators can be present in the polymerizable formulation in an amount between about 1% w/w to about 5% w/w. Photoinitiators generally help to sensitize the polymerizable composition to UV light for photopolymerization.

Embodiments of the invention include a light-emitting device comprising a light-emitting element and an optical material arranged to receive and convert at least a portion of light emitted by the light emitting element from a first emission wavelength to one or more predetermined wavelengths, wherein the optical material comprises a composition taught herein.

In certain embodiments, the optical material can encapsulate at least the light emitting-surface of the light-emitting element. In certain embodiments, the optical material can be spaced from the light emitting-surface of the light-emitting element. In certain of such embodiments, the optical material can be included in the light-emitting device in the form of an optical component.

Embodiments of the invention also include display including a backlight member including a plurality of light-emitting diodes and an optical material arranged to receive and convert at least a portion of light emitted by at least a portion of the light-emitting diodes from a first emission wavelength to one or more predetermined wavelengths, wherein the optical material comprises a composition taught herein.

In certain embodiments, the display comprises a liquid crystal display.

Certain embodiments of the present invention are directed to methods of preventing, reducing, or inhibiting decay of quantum dot emission under heat and/or incident light flux comprising associating quantum dots included in a composition with an emission stabilizer.

Certain embodiments of the present invention are directed to methods of preventing, reducing, or inhibiting dissociation of an exciton from a quantum dot into an electron occupying an available, mid-gap surface state on the quantum dot comprising associating quantum dots included in a composition with an emission stabilizer. Certain embodiments are directed to methods of preventing, reducing, or inhibiting charge creation on the surface of a quantum dot comprising associating quantum dots included in a composition with an emission stabilizer. Certain embodiments are directed to methods of preventing, reducing, or inhibiting charge creation on the surface of a quantum dot resulting from dissociation of an exciton from a quantum dot into an electron occupying an available, mid-gap surface state on the quantum dot comprising associating quantum dots included in a composition with an emission stabilizer.

Certain embodiments of the present invention are directed to methods of preventing, reducing, or inhibiting reduced emission from a quantum dot as a result of charge creation on the surface of a quantum dot under heat and/or incident light flux comprising associating quantum dots included in a composition with an emission stabilizer. Certain embodiments are directed to methods of preventing, reducing, or inhibiting reduced emission from a quantum dot as a result of charge creation on the surface of a quantum dot resulting from dissociation of an exciton from a quantum dot into an electron occupying an available, mid-gap surface state on the quantum dot under heat and/or incident light flux comprising associating quantum dots included in a composition with an emission stabilizer.

Certain embodiments of the present invention are directed to methods of preventing, reducing, or inhibiting formation of elemental metal from quantum dots under heat and/or incident light flux comprising associating quantum dots included in a composition with an emission stabilizer. Certain embodiments are directed to methods of preventing, reducing, or inhibiting formation of elemental metal from quantum dots by preventing, reducing, or inhibiting dissociation of an exciton from a quantum dot into an electron under heat and/or incident light flux comprising associating quantum dots included in a composition with an emission stabilizer. Certain embodiments are directed to methods of preventing, reducing, or inhibiting formation of elemental metal from quantum dots by preventing, reducing, or inhibiting dissociation of an exciton from a quantum dot into an electron where it can reduce the oxidation state of the metal under heat and/or incident light flux comprising associating quantum dots included in a composition with an emission stabilizer. Certain embodiments are directed to methods of preventing, reducing, or inhibiting the reduction of the oxidation state of a metal in a quantum dot under heat and/or incident light flux comprising associating quantum dots included in a composition with an emission stabilizer. Certain embodiments are directed to methods of preventing, reducing, or inhibiting the reduction of the oxidation state of a metal in a quantum dot by preventing, reducing, or inhibiting dissociation of an exciton from a quantum dot into an electron where it can reduce the oxidation state of the metal under heat and/or incident light flux comprising associating quantum dots included in a composition with an emission stabilizer.

Certain embodiments of the present invention are directed to methods of preventing, reducing, or inhibiting anodic corrosion or decomposition of quantum dots. Embodiments of the present invention are directed to methods of preventing, reducing, or inhibiting hole formation in quantum dots under heat and/or incident light flux comprising associating quantum dots included in a composition with an emission stabilizer. Certain embodiments are directed to methods of preventing, reducing, or inhibiting hole formation in quantum dots resulting in anodic corrosion or decomposition of quantum dots under heat and/or incident light flux comprising associating quantum dots included in a composition with an emission stabilizer. Certain embodiments are directed to methods of preventing, reducing, or inhibiting anodic corrosion or decomposition of quantum dots by preventing, reducing, or inhibiting dissociation of an exciton from a quantum dot into an electron occupying an available, mid-gap surface state on the quantum dot thereby leaving a hole in the quantum dot that can promote anodic corrosion or decomposition under heat and/or incident light flux comprising associating quantum dots included in a composition with an emission stabilizer.

Certain embodiments of the above methods can improve or enhance the stability of the quantum dots and/or luminance of the quantum dots under heat and/or incident light flux environments. Such environments can include, for example, a flux in excess of, e.g., 25 mW/cm$^2$, in excess of 1 W/cm$^2$ and/or at temperature of up to or in excess of 100° C.

While not wishing to be bound by theory, in certain embodiments, it is believed that an emission stabilizer can prevent, reduce, or inhibit dissociation of an exciton from a quantum dot into an electron occupying an available, mid-gap surface state on the quantum dot.

While not wishing to be bound by theory, in certain embodiments, it is believed that an emission stabilizer can prevent, reduce, or inhibit charge creation on the surface of a quantum dot and/or hole formation in the quantum dot.

While not wishing to be bound by theory, in certain embodiments, it is believed that an emission stabilizer can prevent, reduce, or inhibit formation of elemental metal from quantum dots by preventing, reducing, or inhibiting dissociation of an exciton from a quantum dot into an electron where it can reduce the oxidation state of the metal.

While not wishing to be bound by theory, in certain embodiments, it is believed that an emission stabilizer can prevent, reduce, or inhibit anodic corrosion or decomposition of quantum dots by preventing, reducing, or inhibiting dissociation of an exciton from a quantum dot into an electron occupying an available, mid-gap surface state on the quantum dot thereby leaving a hole in the quantum dot that can promote anodic corrosion or decomposition.

While not wishing to be bound by theory, in certain embodiments, it is believed that an emission stabilizer can prevent, reduce, or inhibit formation of elemental metal from quantum dots or can prevent, reduce, or inhibit anodic corrosion or decomposition of quantum dots such that a substantially uniform dispersion of the quantum dots in a composition can be substantially maintained.

Compositions and optical components described herein may be incorporated into a wide variety of other consumer products, including flat panel displays, computer monitors, all-in-one computers, notebooks, tablets, televisions, billboards, lights for interior or exterior illumination and/or signaling, heads up displays, fully transparent displays, flexible displays, laser printers, telephones, cell phones, smartphones, personal digital assistants (PDAs), laptop computers, digital cameras, camcorders, viewfinders, microdisplays, vehicles, a large area wall, theater or stadium screen, a sign, lamps and various solid state lighting devices.

Additional information that may be useful in connection with the present invention and the inventions described herein is included in International Application No. PCT/US2009/002796 of Coe-Sullivan et al, filed 6 May 2009, entitled "Optical Components, Systems Including An Optical Component, And Devices", which published as WO 2009/137053 on 12 Nov. 2009; International Application No. PCT/US2009/002789 of Coe-Sullivan et al, filed 6 May 2009, entitled "Solid State Lighting Devices Including Quantum Confined Semiconductor Nanoparticles, An Optical Component For A Solid State Light Device, And Methods", which published as WO 2009/151515 on 17 Dec. 2009; International Application No. PCT/US2010/32859 of Modi et al, filed 28 Apr. 2010 entitled "Optical Materials, Optical Components, And Methods", which published as WO 2010/129374 on 11 Nov. 2010; International Application No. PCT/US2010/032799 of Modi et al, filed 28 Apr. 2010 entitled "Optical Materials, Optical Components, Devices, And Methods", which published as WO 2010/129350 on 11 Nov. 2010; International Application No. PCT/US2011/047284 of Sadasivan et al, filed 10 Aug. 2011 entitled "Quantum Dot Based Lighting", which published as WO 2012/021643 on 16 Feb. 2012; International Application No. PCT/US2008/007901 of Linton et al, filed 25 Jun. 2008 entitled "Compositions And Methods Including Depositing Nanomaterial", which published as WO 2009/014590 on 29 Jan. 2009; U.S. patent application Ser. No. 12/283,609 of Coe-Sullivan et al, filed 12 Sep. 2008 entitled "Compositions, Optical Component, System Including An Optical Component, Devices, And Other Products", which issued as U.S. Pat. No. 8,718,437 on 6 May 2014; International Application No. PCT/US2008/10651 of Breen et al, filed 12 Sep. 2008 entitled "Functionalized Nanoparticles And Method", which published as WO 2009/035657 on 19 Mar. 2009; International Application No. PCT/US2009/004345 of Breen et al, filed 28 Jul. 2009 entitled "Nanoparticle Including Multi-Functional Ligand And Method", which published as WO 2010/014198 on 4 Feb. 2010, U.S. Patent Application No. 61/234,179 of Linton et al. filed 14 Aug. 2009 entitled "Lighting Devices, An Optical Component For A Lighting Device, And Methods"; U.S. Patent Application No. 61/252,743 of Linton et al filed 19 Oct. 2009 entitled "An Optical Component, Products Including Same, And Methods For Making Same"; U.S. Patent Application No. 61/291,072 of Linton et al filed 30 Dec. 2009 entitled "An Optical Component, Products Including Same, And Methods For Making Same"; International Application No. PCT/US2007/024320 of Clough et al, filed 21 Nov. 2007, entitled "Nanocrystals Including A Group Ma Element And A Group Va Element, Method, Composition, Device And Other Products", which published as WO 2008/133660 on 6 Nov. 2008; U.S. Pat. No. 6,600,175 of Baretz, et al., issued Jul. 29, 2003, entitled "Solid State White Light Emitter And Display Using Same"; and U.S. Pat. No. 6,608,332 of Shimizu, et al., issued Aug. 19, 2003, entitled "Light Emitting Device and Display"; each of the foregoing being hereby incorporated herein by reference in its entirety.

The present invention will be further clarified by the following examples, which are intended to be exemplary of the present invention.

EXAMPLES

Example I

Example IA

Preparation of Semiconductor Nanocrystals Capable of Emitting Red Light

Synthesis of CdSe Seed Cores: 45.94 mmol cadmium acetate was dissolved in 669.55 mmol of tri-n-octylphosphine at 100° C. in a 250 mL 3-neck round-bottom flask and then dried and degassed for one hour. 814.69 mmol of trioctylphosphine oxide and 104.85 mmol of octadecylphosphonic acid were added to a 0.5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle was removed from the reactor and 139.9 mmol of diisobutylphosphine selenide (DIBP-Se) dissolved in 105 mL of 1-Dodecyl-2-pyrrolidinone (NDP) (1.5 M DIBP-Se) was then rapidly injected. The reactor was then immediately submerged in partially frozen (via liquid nitrogen) squalane bath rapidly reducing the temperature of the reaction to below 100° C. The first absorption peak of the nanocrystals was 476 nm. The CdSe cores were precipitated out of the growth solution inside a nitrogen atmosphere glovebox by adding a 3:1 mixture of methanol and isopropanol. The isolated cores were then dissolved in hexane and used in a growth process to make red CdSe cores.

Growth of CdSe cores: A 1 L glass reactor was charged with 320 mL of 1-octadecene (ODE) and degassed at 120° C. for 15 minutes under vacuum. The reactor was then backfilled with $N_2$ and the temperature set to 60° C. 82 mL of the CdSe seed core above was injected into the reactor and the hexanes were removed under reduced pressure until the vacuum gauge reading was <500 mTorr. The temperature of the reaction mixture was then set to 240° C. Meanwhile, two 50 mL syringes were loaded with 85 mL of cadmium oleate in TOP (0.5 M conc.) solution and another two syringes were loaded with 85 mL of di-iso-butylphosphine selenide (DiBP-Se) in TOP (0.5 M conc.). Once the reaction mixture reached 240° C., the Cd(oleate)$_2$ and DiBP-Se solutions were infused into the reactor at a rate of 40 mL/hr. The 1st excitonic absorption feature of the CdSe cores was monitored during infusion and the reaction was stopped at 48 minutes when the absorption feature was 566 nm. The resulting CdSe cores were then ready for use as is in this growth solution for overcoating.

Synthesis of CdSe/ZnS/CdZnS Core-Shell Nanocrystals: 177 mL of the CdSe core above with a first absorbance peak at 566 nm was mixed in a 1 L reaction vessel with 1-octadecene (137 mL), and Zn(Oleate)$_2$ (0.5 M in TOP, 54 mL). The reaction vessel was heated to 120° C. and vacuum was applied for 15 min. The reaction vessel was then back-filled with nitrogen and heated to 310° C. The temperature was ramped, between 1° C./5 seconds and 1° C./15 seconds. Once the vessel reached 300° C., octanethiol (23 mL) was swiftly injected and a timer started. Once the timer reached 2 min., one syringe containing zinc oleate (0.5 M in TOP, 104 mL) and cadmium oleate (1 M in TOP, 85 mL), and another syringe containing octanethiol (88 mL) were swiftly injected. Once the timer reached 30 min., the heating mantle was dropped and the reaction cooled by subjecting the vessel to a cool air flow. The final material was precipitated via the addition of butanol and methanol (4:1 ratio), centrifuged at 3000 RCF for 5 min, and the pellet redispersed into hexanes. The sample is then precipitated once more via the addition of butanol and methanol (3:1 ratio), centrifuged, and dispersed into toluene for storage (26.9 g of core/shell material, 618 nm emission, 28 nm FWHM, 93% QY, and 95% EQE in film).

Example IB

Preparation of Semiconductor Nanocrystals Capable of Emitting Green Light

Synthesis of CdSe Cores: The following were added to a 5 L reaction vessel: trioctylphosphine oxide (TOPO: 192 g), 1-octadecene (ODE: 1.1 L), octadecylphosphonic acid (ODPA: 82 g), and cadmium oleate (1M solution in trioctylphosphine (TOP), 244 mL). The reactor was subjected to 3 cycles of vacuum/nitrogen at 120° C., and the temperature was raised to 270° C. under nitrogen. At 270° C., 190 mL of a 1M di-iso-butylphosphine selenide (DiBP-Se) in 1-Dodecyl-2-pyrrolidinone (NDP) solution was rapidly injected, followed by injection of 238 mL of ODE to rapidly drop the temperature to about 230° C. resulting in the production of quantum dots. Immediately following the ODE quench, an infusion of 192 mL of 0.5 M cadmium oleate in trioctylphosphine (TOP) (diluted with 192 mL of ODE) and 153 mL of 1 M DiBP-Se in NDP (diluted with 230 mL of ODE) was continuously introduced into the reaction vessel at a rate of 127 mL/min for a total time of 4.75 min. The 1st excitonic absorption feature the core materials was 468 nm. The core solution was used without further purification to make core-shell materials.

Synthesis of CdSe/ZnS/CdZnS QDs: A 5 L reactor was charged with 615.7 mL of the green core solution above and 414.4 mL of zinc oleate solution (0.5 M in TOP). The reaction vessel was heated to 120° C. and vacuum applied for 15 minutes. The reaction vessel was back-filled with nitrogen and heated to 310° C. The temperature ramp was between 1° C./5 seconds and 1° C./15 seconds. Once the temperature reached 150° C., octanethiol (144 mL) was rapidly injected into the reaction vessel. When the temperature reached 230° C., a timer was started. The temperature continued to ramp to a set point of 310° C. Once the timer reached 30 minutes, a syringe containing zinc oleate/TOP solution (0.5 M, 580 mL) and cadmium oleate/TOP solution (1 M, 143 mL), and TOP-S (2 M, 371 mL) was rapidly injected. The temperature dropped to about 230° C. and returned to its 310° C. set point. Once the timer reached 60 minutes, the heating mantle was dropped and the reaction was cooled by subjecting the vessel to a cool air flow.

Quantum dots were precipitated by the addition of butanol and methanol (4:1 ratio) and then redispersed into toluene for storage (19.8 g of core/shell material). The core-shell materials had an emission maximum of 516 nm, 35 nm FWHM and a film EQE of 94%.

Example II

Formation of a Composition Including a Host Material Including an Emission Stabilizer within a Capillary Test samples including compositions in accordance with present invention were prepared generally in accordance with the following procedure. The ingredients and amounts of ingredients (in grams) included in the various samples are set forth in Table 1 below. The red quantum dots included in the samples described in this Example II were prepared generally as set forth in Example IA above. The green quantum dots included in the samples described in this Example II were prepared generally as set forth in Example IB above.

140° C. and <1 mm Hg resulting in the off-white dry product (dodecyl phosphate, dipotassium salt; (KDP)).

A clean, dry Schlenk flask equipped with a magnetic stir bar and rubber septum was charged with, lauryl methacrylate (LMA) (Aldrich Chemical, 96%), dodecanediol diacrylate (D3DMA) as well as any additive(s) indicated in the above Table 1 for the particular example. If additives were used, dispersion in the monomer was assisted by placing the suspension in a sonic bath for 4 minutes and heating gently with a heat gun until no more solid will dissolve. The solution was inerted using a vacuum manifold and degassed in a standard protocol by freeze-pump-thawing the mixture three times successively using liquid nitrogen. The thawed solution is finally placed under nitrogen and labeled "monomer solution".

Separately, a clean, dry Schlenk flask equipped with a magnetic stir bar and rubber septum was charged with treated fumed silica (TS-720, Cabot Corp), titanium dioxide (R902+, DuPont Corp.) and inerted under nitrogen. To this is added toluene (dry and oxygen free). The mixture is placed in an ultrasonic bath for 10 minutes and then stirred under nitrogen. This is labeled "metal oxide slurry".

TABLE 1

| Ingredient | Example IIA (includes emission stabilizer of TOPO) (grams) | Example IIB (includes emission stabilizer of KDP) (grams) | Example IIC (includes emission stabilizer of Zinc Oleate) (grams) | Example IID (includes emission stabilizer of KDP & TOPO) (grams) | Example IIE (includes emission stabilizer of TOPO) (grams) | Example IIF (includes emission stabilizer of Zinc Oleate & TOPO) (grams) |
|---|---|---|---|---|---|---|
| Green Quantum Dots | 0.0988 | 0.1502 | 0.1509 | 0.0999 | 0.2003 | 0.1251 |
| Red Quantum Dots | 0.0379 | 0.0535 | 0.0538 | 0.0362 | 0.0722 | 0.0449 |
| Titanium Oxide | 0.0308 | 0.0454 | 0.0451 | 0.0305 | 0.0605 | 0.0375 |
| Fumed Silica | 2.0017 | 3.0002 | 3.0010 | 2.0000 | 3.9840 | 2.5000 |
| Stabilizer - TOPO | 1.0007 | 0.0000 | 0.0000 | 1.0100 | 4.0030 | 1.2480 |
| Stabilizer KDP | 0.0000 | 0.1486 | 0.0000 | 0.1000 | 0.0000 | 0.0000 |
| Stabilizer Zinc Oleate | 0.0000 | 0.0000 | 0.3000 | 0.0000 | 0.0000 | 0.6240 |
| Photosensitizer | 0.1980 | 0.3080 | 0.3080 | 0.1980 | 0.3960 | 0.2530 |
| Cross-Linker | 2.8500 | 4.4650 | 4.4650 | 2.8500 | 5.3200 | 3.4200 |
| Monomer | 13.8966 | 21.9374 | 21.8500 | 13.9840 | 26.2200 | 17.0430 |
| Total | 20.11 | 30.11 | 30.17 | 20.31 | 40.26 | 25.30 |

As used in Table 1, "Stabilizer" is a short-hand reference to an emission stabilizer; KDP refers to potassium lauryl phosphate, ZnOleate or Zn(oleate)$_2$ refers to zinc oleate, and TOPO refers to tri-octyl phosphine oxide.

KDP can be prepared by known techniques. One example of such known techniques includes the following:

A 250 mL beaker, placed in a 65° C. water bath and equipped with an overhead stirrer, is charged with 50.04 g dodecyl phosphate (DDP). After the DDP is melted, stirring of the molten liquid is started. To the molten DDP is slowly added 41.94 g 50% aqueous potassium hydroxide solution (KOH) followed by 37.86 g of deionized water. The water batch temperature is raised to 70° C. and the solution is stirred at this batch temperature for an additional 3 hours with an indicated solution temperature range of 60-65° C. The beaker is then removed from the overhead stirrer and water bath and placed in a vacuum oven overnight at Separately, a clean, dry Schlenk flask equipped with a magnetic stir bar and rubber septum was inerted under nitrogen. The flask was then charged with a green quantum dot solution in toluene, red quantum dot solution in toluene and additional toluene via syringe and allowed to stir for 5 minutes. Over 6 minutes, the contents of the "monomer solution flask" were added via syringe and stirred for an additional five minutes. The contents of the "metal oxide slurry" flask were next added over 5 minutes via cannula and rinsed over with the aid of a minimum amount of additional toluene.

The stirred flask was then placed in a warm water bath (<60° C.), covered with aluminum foil to protect from light and placed under a vacuum to remove all of the toluene to a system pressure of <200 mtorr. After solvent removal was completed, slurry was removed from heat and, with stirring, Irgacure 2022 photoinitiator (BASF), without purification, was added via syringe and allowed to stir for 5 minutes. The final ink was then ready for transfer to a fill station.

Optical components were prepared with the above-described samples. Each optical component included a glass capillary prepared generally as described below utilizing a composition of one of the above Examples. The capillaries were borosilicate glass capillaries having the following dimensions: 4 mm wide by 1 mm height OD (3.3 mm×0.3 mm ID) by 700 mm length.

A capillary fill station was evacuated with the bottom fill valve closed and the capillaries held at the topmost position in the fill station using an external magnet to a pressure of less than 100 mtorr. The flask was then repressurized with nitrogen. The pump/refill procedure was repeated an additional two times to complete inerting of the fill column and capillaries.

The bottom column fill valve was opened allowing nitrogen to flush the Teflon fill tube. The column transfer hose was passed through a septum in the quantum dot formulation flask which had been removed from the magnetic stirrer. The hose was only pushed so far as to be in the flask headspace. The fill column was then placed under vacuum. The fill tubing was pushed into the bottom of the formulation flask at which point fluid began drawing through the hose into the fill column.

Before fluid transfer was complete, the valve at the bottom of the filling station was closed to ensure no nitrogen bubbles were pulled into the fill station via the transfer hose. The fill column pressure began to drop with much foaming. After about 3 to 5 minutes, the pressure stabilized at about 120 mtorr and foaming had abated. At this point, the capillaries were magnetically slid into the fill solution at the bottom of the column and the fill station was gradually repressurized with nitrogen.

The columns visibly filled with quantum dot ink solution in about 20 seconds. But, pressure was maintained for 1 minute to ensure all capillaries had enough time to fill completely.

The quantum dot formulation flask was next placed under vacuum while the bottom fill station valve was opened allowing the unused ink to flow back into the original mixing flask. When this transfer was completed, the bottom fill station valve was closed and both the fill station and the quantum dot ink mixing flask were placed under nitrogen.

The fill station Teflon bottom fitting was removed and capillary bundle was taken out of the assembly. Teflon tape securing bundle was removed and capillaries were separated and wiped clean of ink residue with a hexane soaked Kimwipe. The open end of the filled capillary was sealed with a dab of hot glue from a hot glue gun and allowed to harden. The capillaries were then placed, glass sealed end first on a curing oven belt equipped with one "H" and one "D" bulb running at a rate of 1.1 ft/min. Total energy dose was 2900 mJ/cm$^2$.

Cured capillaries were scored with a glass scribe, transferred into a nitrogen box and snapped to their final desired length. They were then capped with epoxy and a brass cap as described in the capillary sealing procedure.

The completed, sealed capillary(ies) were exposed to 30 mW/cm$^2$ light flux with a wavelength of about 450 nm, for 12 hours at 60° C. prior to any analytical testing.

Example III

Example IIIA

Preparation of Semiconductor Nanocrystals Capable of Emitting Red Light

Synthesis of CdSe Seed Cores: 262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle is removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor is then immediately submerged in partially frozen (via liquid nitrogen) squalane bath rapidly reducing the temperature of the reaction to below 100° C. The first absorption peak of the nanocrystals was 480 nm. The CdSe cores were precipitated out of the growth solution inside a nitrogen atmosphere glovebox by adding a 3:1 mixture of methanol and isopropanol. After removal of the methanol/isopropanol mixture, the isolated cores were then dissolved in hexane and used to make core-shell materials. The isolated material specifications were as follows: Optical Density @ 350 nm=2.83; Abs=481 nm; Emission=510 nm; FWHM=40 nm; Total Volume=1.9 L of hexane.

Growth of CdSe cores: A 1 L glass reactor was charged with 320 mL of 1-octadecene (ODE) and degassed at 120° C. for 15 minutes under vacuum. The reactor was then backfilled with $N_2$ and the temperature set to 60° C. 120 mL of the CdSe seed core above was injected into the reactor and the hexanes were removed under reduced pressure until the vacuum gauge reading was <500 mTorr. The temperature of the reaction mixture was then set to 240° C. Meanwhile, two 50 mL syringes were loaded with 80 mL of cadmium oleate (also referred to herein as Cd oleate or Cd(oleate)$_2$) in TOP (0.5 M conc.) solution and another two syringes were loaded with 80 mL of di-iso-butylphosphine selenide (DiBP-Se) in TOP (0.5 M conc.). Once the reaction mixture reached 240° C., the cadmium oleate and DiBP-Se solutions were infused into the reactor at a rate of 35 mL/hr. The 1st excitonic absorption feature of the CdSe cores was monitored during infusion and the reaction was stopped at ~60 minutes when the absorption feature was 569 nm. The resulting CdSe cores were then ready for use as is in this growth solution for overcoating.

Synthesis of CdSe/ZnS/CdZnS Core-Shell Nanocrystals: 115 mL of the CdSe core above with a first absorbance peak at 569 nm was mixed in a 1 L reaction vessel with 1-octadecene (45 mL), and Zn(Oleate)$_2$ (0.5 M in TOP, 26 mL). The reaction vessel was heated to 120° C. and vacuum was applied for 15 min. The reaction vessel was then back-filled with nitrogen and heated to 310° C. The temperature was ramped, between 1° C./5 seconds and 1° C./15 seconds. Once the vessel reached 300° C., octanethiol (11.4 mL) was swiftly injected and a timer started. Once the timer reached 6 min., one syringe containing zinc oleate (0.5 M in TOP, 50 mL) and cadmium oleate (1 M in TOP, 41 mL), and another syringe containing octanethiol (42.2 mL) were swiftly injected. Once the timer reached 40 min., the heating mantle was dropped and the reaction cooled by subjecting the vessel to a cool air flow. The final material was precipitated via the addition of butanol and methanol (4:1 ratio), centrifuged at 3000 RCF for 5 min, and the pellet redispersed into hexanes. The sample is then precipitated once more via the addition of butanol and methanol (3:1 ratio), centrifuged, and dispersed into toluene for storage (616 nm emission, 25 nm FWHM, 80% QY, and 94% EQE in film).

Example IIIB

Preparation of Semiconductor Nanocrystals Capable of Emitting Green Light

Synthesis of CdSe Cores: 262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle was removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor was then immediately submerged in a partially frozen (via liquid nitrogen) squalane bath rapidly reducing the temperature of the reaction to below 100° C. The first absorption peak of the nanocrystals was 487 nm. The CdSe cores were precipitated out of the growth solution inside a nitrogen atmosphere glovebox by adding a 3:1 mixture of methanol and isopropanol. The isolated cores were then dissolved in hexane and used to make core-shell materials. The isolated material specifications were as follows: Optical Density @ 350 nm=1.62; Abs=486 nm; Emission=509 nm; FWHM=38 nm; Total Volume=1.82 L of hexane.

Synthesis of CdSe/ZnS/CdZnS Core-Shell Nanocrystals: 335 mL of 1-octadecene (ODE), 12.55 g of zinc acetate, and 38 mL of oleic acid were loaded into a 1 L glass reactor and degassed at 100° C. for 1 hour. In a 1 L 3-neck flask, 100 mL of ODE was degassed at 120° C. for 1 hour. After degassing, the temperature of the flask was reduced to 65° C. and then 23.08 mmol of CdSe cores from the procedure above (275 mL) were blended into the 100 mL of degassed ODE and the hexane was removed under reduced pressure. The temperature of the reactor was then raised to 310° C. In a glove box, the core/ODE solution and 40 mL of octanethiol were added to a 180 mL container. In a 600 mL container, 151 mL of 0.5 M Zn Oleate in TOP, 37 mL of 1.0 M Cd Oleate in TOP, and 97 mL of 2 M TOP-S were added. Once the temperature of the reactor hit 310° C., the ODE/QD cores/Octanethiol mixture was injected into the reactor and allowed to react for 30 min at 300° C. After this reaction period, the Zn Oleate/Cd Oleate/TOP-S mixture was injected to the reactor and the reaction was allowed to continue for an additional 30 minutes at which point the mixture was cooled to room temperature. The resulting core-shell material was precipitated out of the growth solution inside a nitrogen atmosphere glovebox by adding a 2:1 mixture of butanol and methanol. The isolated quantum dots (QDs) were then dissolved in toluene and precipitated a second time using 2:3 butanol:methanol. The QDs were finally dispersed in toluene. The isolated material specifications were as follows: Optical Density @ 450 nm (100 Fold Dilution)=0.32; Abs=501 nm; Emission=518 nm; FWHM=38 nm; Solution QY=60%; Film EQE=93%.

Example IV

Formation of a Composition Including a Host Material without an Emission Stabilizer within a Capillary Test samples were prepared generally in accordance with the following procedure. The red quantum dots included in the samples described in this Example IV were prepared generally as set forth in Example IIIA above. The green quantum dots included in the samples described in this Example IV were prepared generally as set forth in Example IIIB above.

A 200 ml Schenk flask equipped with a rubber septum and magnetic stir bar was charged with fumed silica (Cabot, TS-720, 1.428 g without further purification), titania (DuPont, R902+, 0.0286 g, without further purification). No emission stabilizer was included. The charged flask was placed on a Schenk line and evacuated to less than 100 mtorr, taking care to keep the evacuation rate low as to prevent pulling the fumed metal oxides into the manifold. The flask was then repressurized with nitrogen. This pump/refill procedure was repeated an additional two times.

To the flask was added 25 ml of toluene (SPS purification system, substantially water and air free). The flask was swirled by hand to wet out the powder and stirred at 300 rpm on a magnetic stir plate for about 3 minutes to mix the fumed metal oxides into a slurry. The flask was sealed and removed from the vacuum manifold and transferred to a sonic bath where it was sonicated for 5 minutes. At the end of the 5 minutes, it was removed from the sonicator, attached back to the manifold and blanketed with nitrogen. The slurry was again stirred at 300 rpm, being noticeably lower in viscosity than before sonication.

Green quantum dot solution (prepared generally as described in Example IIIB and dissolved in toluene with a solution concentration of 26.62 mg/ml inorganic basis, 2.817 ml, emission maximum of 517.5 nm and FWHM of 37.9 nm) was transferred to the stirred fumed metal oxide slurry via airless syringe transfer. The rate of addition was rapid and not controlled. The slurry was allowed to stir for 3 minutes during which time the entire slurry turned a uniform green color.

Red quantum dot solution (prepared generally as described in Example IIIA and dissolved in toluene with a solution concentration of 55.36 mg/ml inorganic basis, 0.542 ml, emission maximum of 616 nm and a FWHM of 24.8 nm) was transferred to the stirred fumed metal oxide slurry via airless syringe transfer. The rate of addition was rapid and not controlled. The slurry was allowed to stir for 3 minutes during which time the entire slurry turned a uniform deep orange color. 5 ml of toluene was transferred to the reaction flask via syringe, being used to remove fumed metal oxide or quantum dots from the walls of the flask.

Lauryl methacrylate (Aldrich Chemical, 96%, 11.64 ml) was transferred to the reaction flask dropwise over 6 minutes. The addition was done by hand. After the addition was complete, the slurry was allowed to stir for 3 minutes.

D3DMA (11.64 ml) was transferred to the reaction flask dropwise over 3 minutes. The addition was done by hand. After the addition was complete, the slurry was allowed to stir for 3 minutes.

The flask was evacuated at such a rate as to prevent foaming of the slurry out of the flask. After 3-5 minutes, the vacuum valve was in a fully opened position. The flask was then placed in a water bath set to a surface hot plate temperature of 50° C. to prevent evaporative cooling of the reaction flask contents. After about 2 hours, the system pressure dropped to 140 mtorr and slowed substantially. At this point, the flask was repressurized with nitrogen while stirring continued.

Irgacure 2022 photoinitiator (BASF, 140 µl without purification) was added to the formulation flask via syringe. The mixture was swirled by hand to mix and returned to the magnetic stir plate for continued stirring.

A capillary fill station was evacuated with the bottom fill valve closed and the capillaries held at the topmost position in the fill station using an external magnet to a pressure of less than 100 mtorr. The flask was then repressurized with nitrogen. The pump/refill procedure was repeated an additional two times to complete inerting of the fill column and capillaries.

The bottom column fill valve was opened allowing nitrogen to flush the Teflon fill tube. The column transfer hose was passed through a septum in the quantum dot formulation flask which had been removed from the magnetic stirrer. The hose was only pushed so far as to be in the flask headspace. The fill column was then placed under vacuum. The fill tubing was pushed into the bottom of the formulation flask at which point fluid began drawing through the hose into the fill column.

Before fluid transfer was complete, the valve at the bottom of the filling station was closed to ensure no nitrogen bubbles were pulled into the fill station via the transfer hose. The fill column pressure began to drop with much foaming. After about 3 to 5 minutes, the pressure stabilized at about 120 mtorr and foaming had abated. At this point, the capillaries were magnetically slid into the fill solution at the bottom of the column and the fill station was gradually repressurized with nitrogen.

The columns visibly filled with quantum dot ink solution in about 20 seconds. But, pressure was maintained for 1 minute to ensure all capillaries had enough time to fill completely.

The quantum dot formulation flask was next placed under vacuum while the bottom fill station valve was opened allowing the unused ink to flow back into the original mixing flask. When this transfer was completed, the bottom fill station valve was closed and both the fill station and the quantum dot ink mixing flask were placed under nitrogen.

The fill station Teflon bottom fitting was removed and capillary bundle was taken out of the assembly. Teflon tape securing bundle was removed and capillaries were separated and wiped clean of ink residue with a hexane soaked Kimwipe. The open end of the filled capillary was sealed with a dab of hot glue from a hot glue gun and allowed to harden. The capillaries were then placed, glass sealed end first on a curing oven belt equipped with one "H" and one "D" bulb running at a rate of 1.1 ft/min. Total energy dose was 2900 mJ/cm$^2$.

Cured capillaries were scored with a glass scribe, transferred into a nitrogen box and snapped to their final desired length. They were then capped with epoxy and a brass cap as described in the capillary sealing procedure.

The completed, sealed capillary(ies) were exposed to 30 mW/cm$^2$ light flux with a wavelength of about 450 nm, for 12 hours at 60° C. prior to any analytical testing.

Example V

Increased Stability or Enhanced Performance

The setup consists of an array of blue LED with peak wavelength of 445 nm. A test capillary is subjected to a blue light flux of ~400 mW blue optical power/LED. The test capillary is held at a distance of about 0.6 mm above the LED array. The temperature of the composition (quantum dot-containing polymer matrix) at these conditions has been determined to be ~112° C. This is measured by placing a 1 mil Type-T thermocouple in the matrix. The thermocouple is placed in the glass capillary prior to filling and curing the ink.

The emission spectra of the test capillary including the composition of the Example being tested was captured prior to the start of the blue light exposure. This is done by exciting the quantum dots in the composition with a 445 nm blue light source and measuring the resultant spectra in a half moon integrating sphere. The performance of the test capillary was monitored during the period of exposure to the 445 nm blue light flux in the above-described set up. The change in performance of quantum dots in the test capillary is tracked periodically by measuring the resultant lumens (upon excitation with a 445 nm blue light source) in an integrating sphere.

FIGS. 1-4 present data for test capillaries including compositions including an emission stabilizer in accordance with the invention, as described in Example II. (The data for curves labeled "TOPO" or "with TOPO" were prepared generally as described in Example IIA. The data for curves labeled "TOPO and KDP" or "with TOPO+KDP" were prepared generally as described in Example IID. The data for curves labeled "TOPO and Zn Oleate" or "with TOPO+Zn oleate" were prepared generally as described in Example IIF. The data for curves labeled "KDP" were prepared generally as described in Example JIB. The data for curves labeled "Zn Oleate" were prepared generally as described in Example IIC.) Such test capillaries were prepared substantially as described in Example II above and tested substantially as described in Example V above. The data for the curves in FIGS. 1-4 labeled "no additive" or control were generated from a test capillary prepared substantially as described in Example IV and tested substantially as described in this Example V.

Example VI

Example VIA

Preparation of Semiconductor Nanocrystals Capable of Emitting Red Light

Synthesis of CdSe Seed Cores: 262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle is removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor is then immediately submerged in partially frozen (via liquid nitrogen) squalane bath rapidly reducing the temperature of the reaction to below 100° C. The first absorption peak of the nanocrystals was 480 nm. The CdSe cores were precipitated out of the growth solution inside a nitrogen atmosphere glovebox by adding a 3:1 mixture of methanol and isopropanol. After removal of the methanol/isopropanol mixture, the isolated cores were then dissolved in hexane and used to make core-shell materials. The isolated material specifications were as follows: Optical Density @ 350 nm=2.83; Abs=481 nm; Emission=510 nm; FWHM=40 nm; Total Volume=1.9 L of hexane.

Growth of CdSe cores: A 1 L glass reactor was charged with 320 mL of 1-octadecene (ODE) and degassed at 120° C. for 15 minutes under vacuum. The reactor was then backfilled with $N_2$ and the temperature set to 60° C. 120 mL of the CdSe seed core above was injected into the reactor and the hexanes were removed under reduced pressure until the vacuum gauge reading was <500 mTorr. The temperature of the reaction mixture was then set to 240° C. Meanwhile, two 50 mL syringes were loaded with 80 mL of cadmium oleate in TOP (0.5 M conc.) solution and another two syringes were loaded with 80 mL of di-iso-butylphosphine selenide (DiBP-Se) in TOP (0.5 M conc.). Once the reaction mixture reached 240° C., the Cd oleate and DiBP-Se solutions were infused into the reactor at a rate of 35 mL/hr. The 1st excitonic absorption feature of the CdSe cores was monitored during infusion and the reaction was stopped at ~60 minutes when the absorption feature was 569 nm. The resulting CdSe cores were then ready for use as is in this growth solution for overcoating.

Synthesis of CdSe/ZnS/CdZnS Core-Shell Nanocrystals: 115 mL of the CdSe core above with a first absorbance peak at 569 nm was mixed in a 1 L reaction vessel with 1-octadecene (45 mL), and Zn(Oleate) (0.5 M in TOP, 26 mL). The reaction vessel was heated to 120° C. and vacuum was applied for 15 min. The reaction vessel was then back-filled with nitrogen and heated to 310° C. The temperature was ramped, between 1° C./5 seconds and 1° C./15 seconds. Once the vessel reached 300° C., octanethiol (11.4 mL) was swiftly injected and a timer started. Once the timer reached 6 min., one syringe containing zinc oleate (0.5 M in TOP, 50 mL) and cadmium oleate (1 M in TOP, 41 mL), and another syringe containing octanethiol (42.2 mL) were swiftly injected. Once the timer reached 40 min., the heating mantle was dropped and the reaction cooled by subjecting the vessel to a cool air flow. The final material was precipitated via the addition of butanol and methanol (4:1 ratio), centrifuged at 3000 RCF for 5 min, and the pellet redispersed into hexanes. The sample is then precipitated once more via the addition of butanol and methanol (3:1 ratio), centrifuged, and dispersed into toluene for storage (616 nm emission, 25 nm FWHM, 80% QY, and 94% EQE in film).

Example VIB

Preparation of Semiconductor Nanocrystals Capable of Emitting Green Light

Synthesis of CdSe Cores: 262.5 mmol of cadmium acetate was dissolved in 3.826 mol of tri-n-octylphosphine at 100° C. in a 3 L 3-neck round-bottom flask and then dried and degassed for one hour. 4.655 mol of trioctylphosphine oxide and 599.16 mmol of octadecylphosphonic acid were added to a 5 L stainless steel reactor and dried and degassed at 140° C. for one hour. After degassing, the Cd solution was added to the reactor containing the oxide/acid and the mixture was heated to 310° C. under nitrogen. Once the temperature reached 310° C., the heating mantle was removed from the reactor and 731 mL of 1.5 M diisobutylphosphine selenide (DIBP-Se) (900.2 mmol Se) in 1-Dodecyl-2-pyrrolidinone (NDP) was then rapidly injected. The reactor was then immediately submerged in a partially frozen (via liquid nitrogen) squalane bath rapidly reducing the temperature of the reaction to below 100° C. The first absorption peak of the nanocrystals was 480 nm. The CdSe cores were precipitated out of the growth solution inside a nitrogen atmosphere glovebox by adding a 3:1 mixture of methanol and isopropanol. The isolated cores were then dissolved in hexane and used to make core-shell materials. The isolated material specifications were as follows: Optical Density @ 350 nm=1.93; Abs=483 nm; Emission=507 nm; FWHM=37 nm; Total Volume=1.45 L of hexane.

Synthesis of CdSe/ZnS/CdZnS Core-Shell Nanocrystals: 216 mL of octadecene (ODE), 16.5 g of zinc acetate, and 50 mL of oleic acid were loaded into a 1 L glass reactor and degassed at 100° C. for 1 hour. In a 1 L 3-neck flask, 127 mL of ODE was degassed at 120° C. for 1 hour. After degassing, the temperature of the flask was reduced to 65° C. and then 53.8 mmol of CdSe cores from the procedure above (297 mL) were blended into the 127 mL of degassed ODE and the hexane was removed under reduced pressure. The temperature of the reactor was then raised to 310° C. In a glove box, the core/ODE solution and 52 mL of octanethiol were added to a 180 or 360 mL container. In a 600 mL container, 164 mL of 0.5 M Zn Oleate in TOP, 67 mL of 1.0 M Cd Oleate in TOP, and 128 mL of 2 M TOP-S were added. Once the temperature of the reactor hit 310° C., the ODE/QD cores/ Octanethiol mixture was injected into the reactor and allowed to react for 30 min at 300° C. After this reaction period, the Zn Oleate/Cd Oleate/TOP-S mixture was injected to the reactor and the reaction was allowed to continue for an additional 30 minutes at which point the mixture was cooled to room temperature. The resulting core-shell material was precipitated out of the growth solution inside a nitrogen atmosphere glovebox by adding a 2:1 mixture of butanol and methanol. The isolated quantum dots (QDs) were then dissolved in toluene and precipitated a second time using 2:3 butanol:methanol. The QDs were finally dispersed in toluene. The isolated material specifications were as follows: Optical Density @ 350 nm=3.25; Abs=510 nm; Emission=526 nm; FWHM=33 nm; Solution QY=60; Film EQE=91%.

Example VII

Testing of Stability of Solution Examples

Quantum dot (QD) emission stability with and without an emission stabilizer was evaluated in solution. The tests were conducted in air-free environment using sealed pyrex glass pressure tubes (e.g. Chemglass Part Number CG-1880-01) using a dilute concentration of QDs (<0.1 optical density at 450 nm for 1 cm path length) in a high boiling solvent (e.g. Squalane). Low concentrations were used to ensure the excitation light penetrated the entire sample. The QD solutions were exposed to a uniform flux of 1 W/cm² at 450 nm. The was no temperature control on the samples—the samples heated up based on QD down conversion and absorption by the glass sample container. A typical temperature for QDs with red wavelength emission (>600 nm) was 120-130° C. The duration of the test, and thus the light exposure, was 3 hrs. At the conclusion of each test, the solution QY, absorption, emission, and FWHM were measured and compared to a control sample that remained in an air-free environment with no light exposure. These QD photophysical properties were assessed using this test in the absence and presence of various emission stabilizers.

Following Table 2 summarizes Red QD photophysical properties (with 62% Cd in the CdZnS shell) of the solution samples prepared as generally described in Example VII and Table 2 with quantum dots prepared as generally described in Examples VIA and VIB, with and without various emission stabilizers.

TABLE 2

| Emission Stabilizer | Control (NO Light Exposure) (Em/FWHM/QY) | WITH Light Exposure (1 W/cm$^2$) (Em/FWHM/QY) |
|---|---|---|
| NO Stabilizer | 617/40/88% | 601/broad absorption with scattering/47/2% |
| TOPO (33%/wt of squalane) | 617/40/77% | 622/44/56% |
| TOPO and Zinc Oleate (5%/wt of squalane and 0.05M, respectively) | 619/26.5/55% | 619/25.8/55% |

Figure 5:
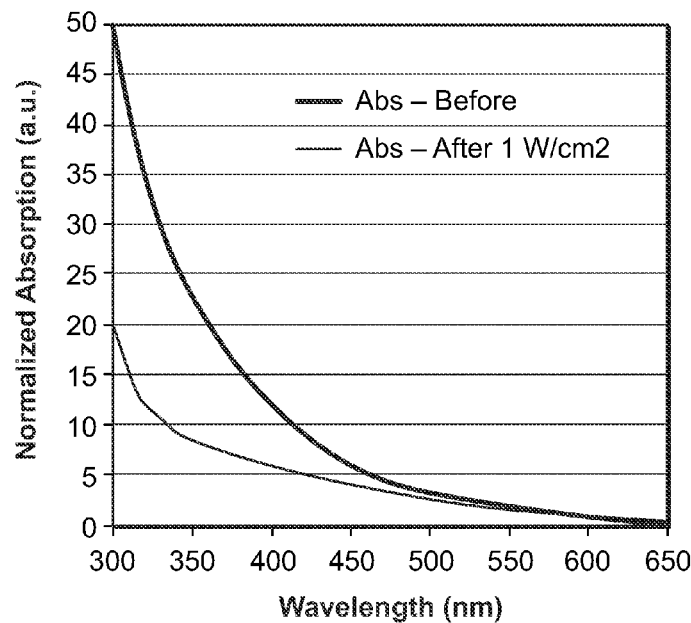
Figure 5:
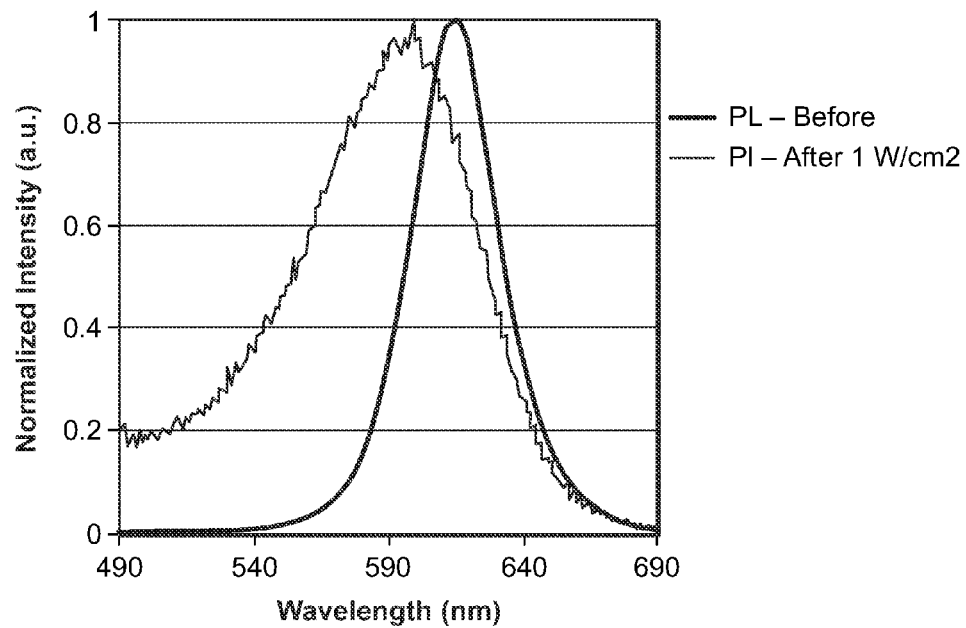
Figure 6:
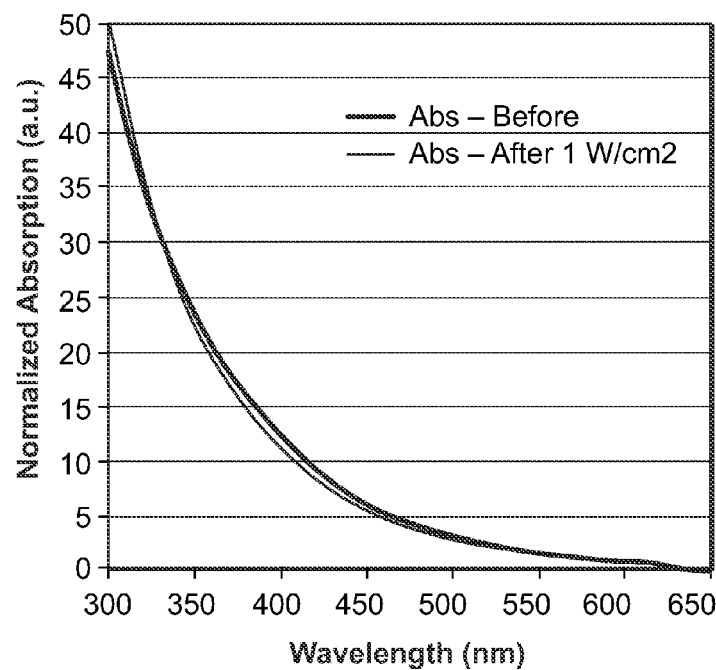
Figure 6:
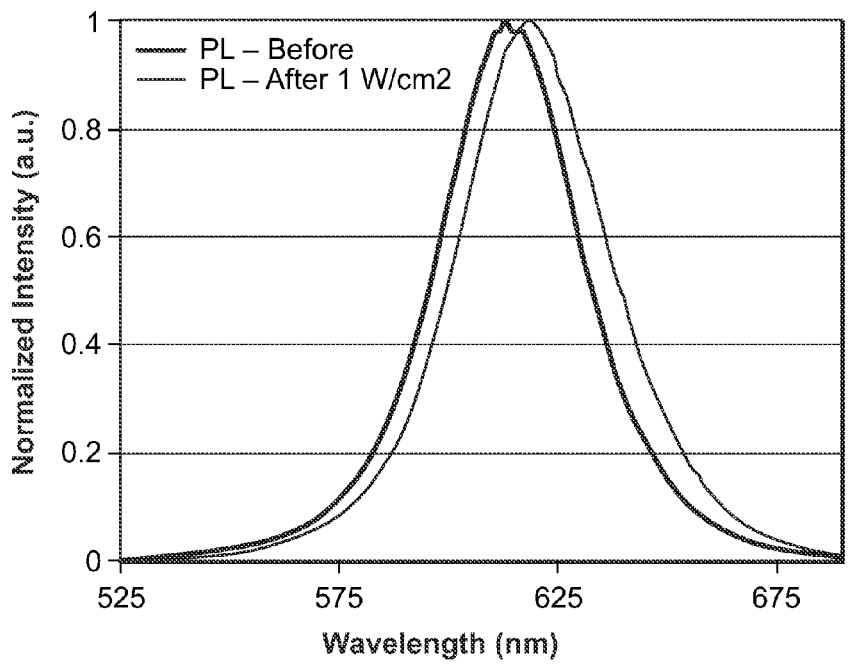
Figure 7:
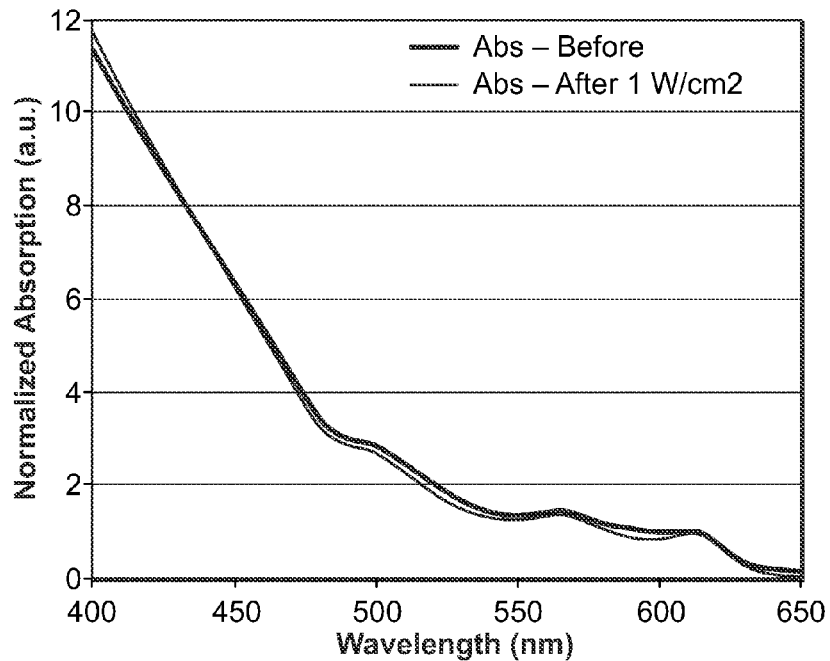
Figure 7:
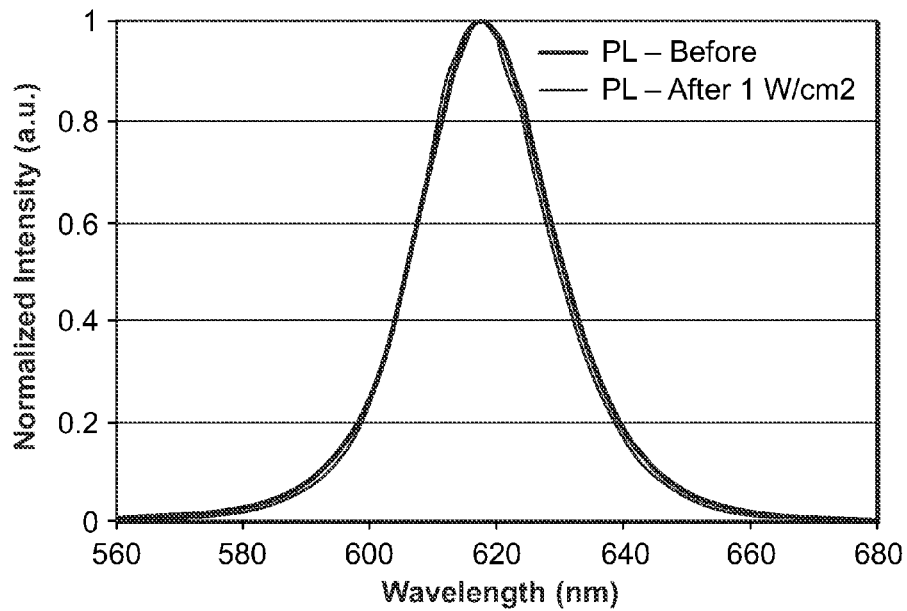

The data included in Table 2 and corresponding FIGS. 5-7 show benefits that can be achieved with inclusion of emission stabilizers relating to the stability of red QDs in the presence of light and heat. In the first case, without a stabilizer, a significant reduction in the absorption at wavelengths<500 nm, indicative of severe degradation of the quantum dots. Once an emission stabilizer is introduced, as seen in the second case with the inclusion of an emission stabilizer comprising TOPO), the reduction in absorption (Abs) is minimized and there are limited changes in the emission (Em) characteristics and solution quantum yield (QY) of the sample, indicating enhanced stability. In the third case (with emission stabilizers comprising TOPO and Zinc Oleate), both the absorption and all of the emission properties of the QDs are preserved indicating further enhanced stability.

Following Tables 3 and 4 summarize Green QD photophysical properties of the solution samples prepared as generally described in Example VII and Tables 3 and 4 with quantum dots prepared as generally described in Examples VI A and VI B, with and without various emission stabilizers. The data for these examples illustrate, along with the red QD example above, that the amount of Zn in the shell can influence the emission stability of the QDs in the presence of the various emission stabilizers.

TABLE 3

Green Quantum Dot Solutions including QDs with 33% Cd in an outer CdZnS shell:

| Emission Stabilizer | Control (NO Light Exposure) (Abs/Em/FWHM/QY) | WITH Light Exposure (1 W/cm$^2$) (Abs/Em/FWHM/QY) |
|---|---|---|
| NO Stabilizer | 501/518/39/86% | gone/510/59/2% |
| TOP only (33%/wt of squalane) | 501.1/518/38/85% | 500.5/517/38/85% |
| TOPO only (33%/wt of squalane) | 501.4/519/38.2/80% | 501.9/519/38.7/75% |

TABLE 4

Green Quantum Dot Solutions including QDs with 45% Cd in an outer CdZnS shell:

| Emission Stabilizer | Control (NO Light Exposure) (Abs/Em/FWHM/QY) | WITH Light Exposure (1 W/cm$^2$) (Abs/Em/FWHM/QY) |
|---|---|---|
| TOPO only (33%/wt of squalane) | 511.6/530.1/28.8/86.5% | 514.9/534/30.5/63.8% |
| Zinc Oleate only (0.05M) | 510.4/529.5/28.1/81.1% | 510.4/529.5/28.8/80.6% |

Figure 8:
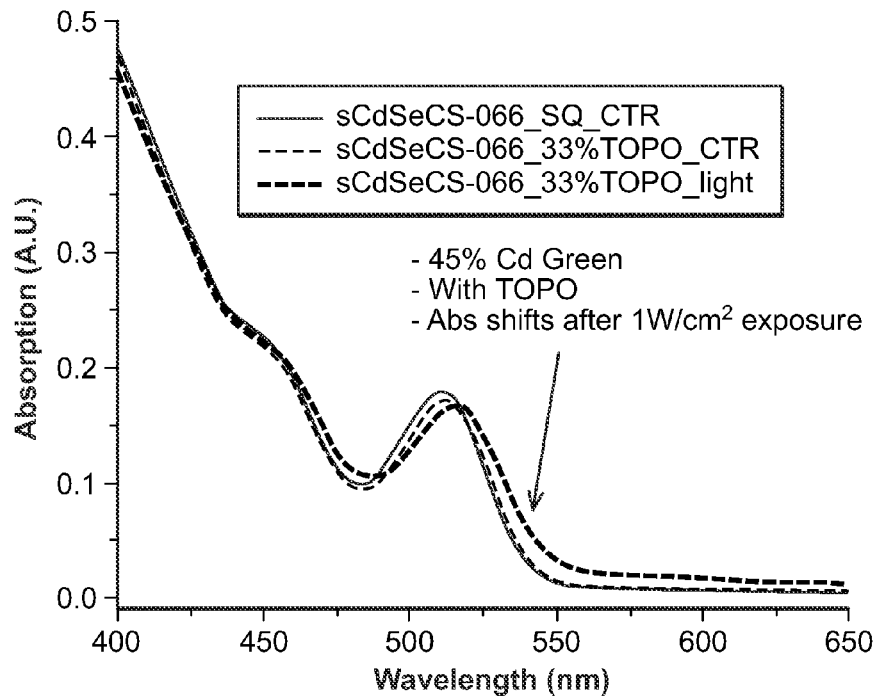
Figure 8:
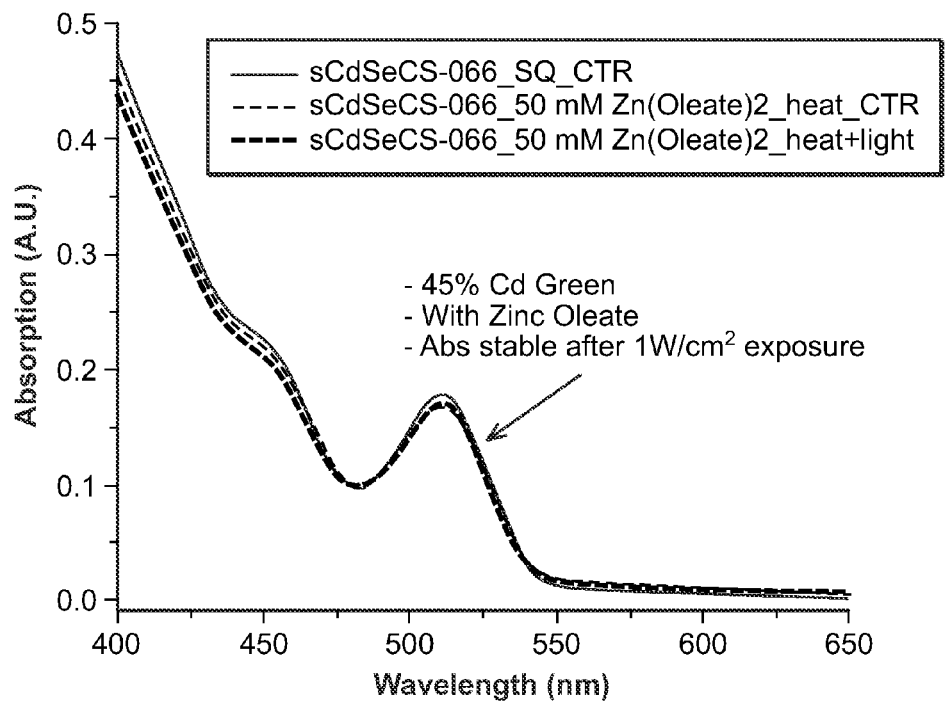

The data presented in Tables 3 and 4 and corresponding FIG. 8 show the results of emission stabilizers on the stability of green QDs in the presence of light and heat. In addition, a comparison of these results (in light of the various Cd contents in the CdZnS shells) with the data for the red QD solution examples above (uses 62% Cd in the shell), shows improved performance for samples including an emission stabilizer with QDs having a higher zinc content in the shell. In the first case, without a stabilizer, similar to the red QD solution examples above, a significant reduction in the absorption and solution QY of the sample indicates severe degradation of the quantum dot. Once an emission stabilizer, e.g., TOPO is introduced, the sample with lower Cd percentage in the shell (i.e. 33%) shows improved stability. The sample with higher Cd content (i.e. 45% Cd in the shell) in the presence of an emission stabilizer comprising TOPO undergoes minimal changes in the absorption and emission characteristics indicating enhanced stability compared to the control (with no emission stabilizer). Finally, in the sample with higher Cd content in the shell (45% Cd), introduction of zinc oleate as an emission stabilizer is able to stabilize this material under the test conditions (similar to the red examples above). Therefore, in cases where the QDs are exposed to heat and/or incident light fluxes or for a QD system that is stable under a given set of conditions, better stability can be seen for compositions including an emission stabilizer(s) and QDs containing an increased Zn content in the shell, wide band gap shell, or shell with a high potential barrier for electrons within the QD.

"Solid state external quantum efficiency" (also referred to herein as "EQE" or "solid state photoluminescent efficiency") can be measured in a 12" integrating sphere using a NIST traceable calibrated light source, using the method developed by Mello et al., Advanced Materials 9(3):230 (1997), which is hereby incorporated by reference. Such measurements can also be made with a QEMS from LabSphere (which utilizes a 4 in sphere; e.g. QEMS-2000: World Wide Website laser2000.nl/upload/documenten/fop_21-en2.pdf).

As used herein, the singular forms "a", "an" and "the" include plural unless the context clearly dictates otherwise. Thus, for example, reference to an emissive material includes reference to one or more of such materials.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A composition comprising emissive quantum dots and an emission stabilizer, wherein the emission stabilizer comprises an aliphatic phosphate-based additive, and wherein the aliphatic phosphate-based additive comprises at least one of potassium octyl phosphate, potassium nonyl phosphate, potassium decyl phosphate, potassium undecyl phosphate, potassium lauryl phosphate, potassium myristyl phosphate, potassium cetyl phosphate, potassium stearyl phosphate, dicetyl phosphate, ceteth-10 phosphate, ceteth-20 phosphate, and ceteth-30 phosphate; wherein the emission stabilizer is present in an amount from about 0.01 to about 99 weight percent of the composition.

2. A composition in accordance with claim 1 wherein quantum dots further comprise one or more ligands attached to a surface thereof.

3. A composition in accordance with claim 2 wherein the emission stabilizer does not displace the ligands.

4. A composition in accordance with claim 2 wherein the composition consists essentially of quantum dots having one or more ligands attached to an outer surface and an emission stabilizer, wherein the emission stabilizer is in addition to the ligands attached to the quantum dots.

5. A composition in accordance with claim 2 wherein the emission stabilizer and ligands have different chemical compositions.

6. A composition in accordance with claim 1 wherein the composition further includes an additional emission stabilizer comprising an aliphatic phosphine oxide-based additive.

7. A composition in accordance with claim 6 wherein the aliphatic phosphine oxide-based additive comprises a substituted or unsubstituted aliphatic phosphine oxide.

8. A composition in accordance with claim 1 wherein the concentration of quantum dots is from about 0.1 to about 98 weight percent of the composition.

9. A composition in accordance with claim 1 wherein the composition further includes a host material.

10. A composition in accordance with claim 9 wherein the emission stabilizer is included in the composition in an amount in a range from about 0.01 to about 10 weight percent of the composition.

11. A composition in accordance with claim 1 wherein the composition further includes an additional emission stabilizer comprising tri-octyl phosphine oxide.

12. A composition in accordance with claim 1 wherein the composition includes two or more emission stabilizers.

13. A composition with claim 1 wherein the aliphatic phosphate-based additive comprises potassium octyl phophate, potassium nonyl phophate, potassium decyl phosphate, potassium undecyl phosphate, potassium lauryl phosphate, potassium myristyl phosphate, potassium cetyl phosphate, or potassium stearyl phosphate.

14. A composition comprising emissive quantum dots and an emission stabilizer, wherein the emission stabilizer comprises potassium lauryl phosphate.

15. An optical component comprising a composition in accordance with claim 1 and a structural member that supports or contains the composition.

16. An optical component in accordance with claim 15 wherein the composition is hermetically contained within the structural member.

17. A composition comprising emissive quantum dots and an emission stabilizer, wherein the emission stabilizer comprises an aliphatic phosphate-based additive, and wherein the aliphatic phosphate-based additive comprises potassium hydrogen octyl phosphate, potassium hydrogen nonyl phosphate, potassium hydrogen decyl phosphate, potassium hydrogen undecyl phosphate, potassium hydrogen lauryl phosphate, potassium hydrogen myristyl phophate, potassium hydrogen cetyl phosphate, or potassium hydrogen stearyl phosphate.

* * * * *